United States Patent
Kuzumoto et al.

(10) Patent No.: US 6,909,467 B2
(45) Date of Patent: Jun. 21, 2005

(54) BROADCAST TEXT DATA SAMPLING APPARATUS AND BROADCAST TEXT DATA SAMPLING METHOD

(75) Inventors: Keiichi Kuzumoto, Neyagawa (JP); Toshihiro Matsumura, Yasu-gun (JP)

(73) Assignee: Matsushita Electric Industrial Co., Ltd. (JP)

( * ) Notice: Subject to any disclaimer, the term of this patent is extended or adjusted under 35 U.S.C. 154(b) by 578 days.

(21) Appl. No.: 09/845,027

(22) Filed: May 1, 2001

(65) Prior Publication Data

US 2002/0008776 A1 Jan. 24, 2002

(30) Foreign Application Priority Data

May 1, 2000 (JP) ........................................ 2000-132521

(51) Int. Cl.[7] ............................ H04N 11/00; H04N 7/00
(52) U.S. Cl. ...................... 348/468; 348/465; 348/466
(58) Field of Search ............................ 348/468, 466, 348/467, 465; H04N 11/00, 7/00

(56) References Cited

U.S. PATENT DOCUMENTS

| | | | | |
|---|---|---|---|---|
| 5,589,886 A | * | 12/1996 | Ezaki | 348/461 |
| 5,838,382 A | * | 11/1998 | Cahill, III | 348/465 |
| 5,861,925 A | * | 1/1999 | Fujitaka | 348/465 |
| 5,917,550 A | * | 6/1999 | Kim | 348/536 |
| 6,043,848 A | * | 3/2000 | Richter | 348/465 |
| 6,462,782 B1 | * | 10/2002 | Honda et al. | 348/465 |

FOREIGN PATENT DOCUMENTS

| | | |
|---|---|---|
| JP | 60-144365 | 9/1985 |
| JP | 60251788 A | 12/1985 |
| JP | 6-121293 | 4/1994 |
| JP | 07-307727 | 11/1995 |
| JP | 8-289261 | 11/1996 |
| JP | 09271000 A | 10/1997 |

* cited by examiner

*Primary Examiner*—Michael H. Lee
*Assistant Examiner*—Trang U. Tran
(74) *Attorney, Agent, or Firm*—Parkhurst & Wendel, L.L.P.

(57) ABSTRACT

A broadcast text data sampling apparatus comprises an A/D converter for sampling a broadcast text signal supplied from the outside, with a sampling clock of a predetermined frequency, to convert the text signal into digital data; a binarization circuit for converting the digital data into a binary signal; a sampling pulse generation circuit for detecting the cycle of clock run-in of the broadcast text signal from the binary signal, obtaining a text data sampling interval value on the basis of the clock run-in cycle, sequentially calculating the positions of data in the binary signal, which data are positioned at intervals close to the sampling interval value, starting from a predetermined sampling start position, and generating a sampling pulse that designates the calculated data positions as data sampling positions; and a sampling circuit for sampling the text data from the binary signal on the basis of the sampling pulse. Therefore, this data sampling apparatus is able to perform sampling of text data from plural types of text broadcastings having different transmission clock frequencies.

5 Claims, 28 Drawing Sheets

Fig.28

| area | type | superimposition line | transmission clock |
|---|---|---|---|
| Europe | teletext | 7~22 | 6.9375MHz |
| | VPS | 16 | 5MHz |
| | WSS | 23 | 5MHz |
| Japan | multiplexed teletext | 14, 15, 17, 21, 277, 278, 279, 284 | 5.7272MHz |
| America | closed caption | 21 | 503kHz |

BROADCAST TEXT DATA SAMPLING APPARATUS AND BROADCAST TEXT DATA SAMPLING METHOD

FIELD OF THE INVENTION

The present invention relates to an apparatus and a method for sampling text data of text broadcastings which are transmitted utilizing the vertical blanking periods of video signals.

BACKGROUND OF THE INVENTION

In various parts of the world, data of text broadcastings are transmitted utilizing the vertical blanking periods of video signals. FIG. 28 is a table showing the types of text broadcastings employed in typical areas, the superimposition lines on which the text broadcastings are superimposed, and the transmission clocks.

In order to sample text data of these text broadcastings, a broadcast text data sampling apparatus as shown in FIG. 27 has conventionally been used. Hereinafter, the construction and operation of the conventional text data sampling apparatus will be described with reference to FIG. 27.

In FIG. 27, an analog video signal, in which text data is superimposed on the vertical blanking period, is inputted through a video signal input terminal 2001. The analog video signal is sampled with a sampling clock fs(MHz) by an A/D converter 2002 to be converted into a digital signal. The digital signal is inputted to a low-pass filter 2003 which performs noise removal or the like, and to a synchronous separation circuit 2004 for separating a vertical sync signal VSYNC and a horizontal sync signal HSYNC from the video signal. In a slice level calculation circuit 2005, an optimum slice level SL is calculated from text data in a predetermined line and a predetermined position, on the basis of the vertical sync signal VSYNC and the horizontal sync signal HSYNC which are outputted from the synchronous separation circuit 2004. In a binarization circuit 2006, the signal which has been subjected to noise removal by the low-pass filter 2003 is converted into a binary signal of 0 or 1 with the slice level SL calculated by the slice level calculation circuit 2005. In the vertical blanking period, there is a period called "clock run-in" for synchronization between the broadcast text signal and the sampling clock. A PLL circuit 2007 performs synchronization of the sampling clock having the same cycle as that of the transmission clock, to the clock run-in, under control of a controller 2008, thereby generating a sampling clock in synchronization with the clock run-in. In a sampling circuit 2009, using the sampling clock so generated, text data are sampled from the binary signal. Then, in a decoding circuit 2010, the sampled data are subjected to a decoding process including error correction or the like, according to the type of the text broadcasting. The data decoded by the decoding circuit 2010 are transmitted to a display circuit (not shown) through an output terminal 2011, and display according to the type of the text broadcasting is carried out.

However, the conventional sampling of text data by using a sampling clock synchronized with the clock run-in by the PLL circuit, has the following drawbacks.

(1) When phase error occurs in the signal in the middle of the line due to group delay or the like, phase error occurs in the text data, resulting in sampling error.

(2) In order to suppress such group delay, a multi-tap filter, i.e., a higher-order filter for waveform equalization, is required. However, since such filter is large in circuit scale, the circuit scale of the whole apparatus is undesirably increased.

(3) Although sampling of text data is carried out at a cycle equal to the cycle of the transmission clock of the text signal, since the transmission clock varies with the type of text broadcasting, a sampling apparatus provided with a PLL circuit having a specific clock for each type of text broadcasting is required. Therefore, it is difficult to deal with plural types of text broadcastings with a single sampling apparatus. Further, it is difficult to fabricate a PLL circuit capable of outputting wide-range and stable clocks and, therefore, it is difficult to deal with plural types of text broadcastings having different transmission clocks, with a sampling apparatus provided with one PLL circuit.

(4) When the signal is degraded due to distortion of the transmission system or the like and thereby the data in the clock run-in have gone, the sampling clock cannot be synchronized with the clock run-in, resulting in sampling error.

SUMMARY OF THE INVENTION

The present invention is made to solve the above-described problems and has for its object to provide an apparatus and a method for sampling data of text broadcasting, that generate no sampling error even when phase error occurs in the text signal in the middle of the line or when the data in the clock run-in have gone, and that can deal with plural types of text broadcasting with a single sampling apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a broadcast text data sampling apparatus comprises: A/D conversion means for sampling a broadcast text signal supplied from the outside, with a sampling clock of a predetermined frequency, to convert the text signal into digital data; binarization means for converting the digital data into a binary signal; sampling pulse generation means for detecting the cycle of clock run-in of the broadcast text signal from the binary signal, obtaining a text data sampling interval value on the basis of the clock run-in cycle, sequentially calculating the positions of data in the binary signal, which data are positioned at intervals close to the sampling interval value, starting from a predetermined sampling start position, and generating a sampling pulse that designates the calculated data positions as data sampling positions; and sampling means for sampling the text data from the binary signal on the basis of the sampling pulse. Therefore, it is possible to judge the type of the text broadcasting from the clock run-in, and sample text data sequentially from the binary signal at sampling intervals according to the type of the text broadcasting, thereby providing a broadcast text data sampling apparatus that can precisely sample text data from plural types of text broadcastings having different transmission clock frequencies.

According to a second aspect of the present invention, the broadcast text data sampling apparatus according to the first aspect further comprises data interpolation means for receiving the digital data outputted from the A/D conversion means, and generating interpolation data for interpolating the digital data so that the amount of the data is multiplied by an integer; wherein the binarization means binarizes the digital data and the interpolation data, and outputs the binarized data as a binary signal; and the sampling pulse generation means sequentially calculates the positions of data in the binary signal obtained by binarizing the digital data and the interpolation data, which data are positioned at intervals close to the sampling interval value, starting from the sampling start position, and then generates a sampling pulse that designates the calculated data positions as data sampling positions. Therefore, it is possible to provide a broadcast text data sampling apparatus that can perform sampling of text data with high precision.

According to a third aspect of the present invention, the broadcast text data sampling apparatus according to the first or second aspect further comprises phase error detection means for detecting a change point of the binary signal, generating a phase error detection sampling start pulse for phase error detection, on the basis of the change point and the sampling interval value, comparing the phase error detection sampling start pulse with the sampling pulse, and when a phase error is detected, outputting a phase error correction pulse indicating the position where the phase error occurs, and a sampling pulse selection signal indicating that the phase error occurs; and sampling pulse correction means for receiving the sampling pulse and the sampling interval value, when the sampling pulse selection signal is not supplied from the phase error detection means, outputting the sampling pulse as a corrected sampling pulse, when the sampling pulse selection signal is supplied, sequentially calculating the positions of data within the binary signal, which data are positioned at intervals close to the sampling interval value, starting from the position that is indicated by the phase error correction pulse outputted from the phase error detection means, and generating a pulse that designates the calculated data positions as data sampling positions, and outputting this pulse as a corrected sampling pulse; wherein the sampling means samples the text data on the basis of the corrected sampling pulse. Therefore, even when an phase error occurs in the broadcast text signal, phase-error-corrected data sampling can be performed, thereby providing a broadcast text data sampling apparatus that can reduce sampling error without increasing the circuit scale.

According to a fourth aspect of the present invention, the broadcast text data sampling apparatus according to the first or second aspect further comprises phase error detection means for detecting a change point of the binary signal, generating a phase error detection sampling start pulse for phase error detection, on the basis of the change point and the sampling interval value, comparing the phase error detection sampling start pulse with the sampling pulse, and when a phase error is detected, outputting a phase error correction pulse indicating the position where the phase error occurs; wherein the sampling pulse generation means sequentially calculating, after receiving the phase error correction pulse, the positions of data within the binary signal, which data are positioned at intervals closest to the sampling interval value, starting from the position that is indicated by the phase error correction pulse, and generates a pulse that designates the calculated data positions as data sampling positions, and then outputs this pulse as the sampling pulse to the sampling means. Therefore, even when an phase error occurs in the broadcast text signal, phase-error-corrected data sampling can be performed, thereby providing a broadcast text data sampling apparatus that can reduce sampling error without increasing the circuit scale.

According to a fifth aspect of the present invention, in the broadcast text data sampling apparatus according to the first or second embodiment, the sampling pulse generation means comprises: clock run-in position setting means for designating the position of a clock run-in period in the broadcast text signal; clock run-in cycle detection means for detecting the cycle of the clock run-in in the clock run-in period, from the binary signal; judgement means for judging the type of the broadcast text signal from the clock run-in cycle detected by the clock run-in cycle detection means, and outputting a text data sampling interval value which is predetermined according to the type of the broadcast text signal; sampling start period setting means for setting a sampling start period for setting the predetermined sampling start position, within a period in the vicinity of the position between the clock run-in and a framing code in the broadcast text signal; sampling start pulse generation means for detecting a change point at which the binary signal changes from 0 to 1 within the sampling start period, and generating a sampling start pulse indicating the predetermined sampling start position that is shifted from the change point by an interval smaller than the sampling interval value; sampling position calculation means for sequentially calculating the positions in the binary signal, which positions are separated at intervals equal to the sampling interval value, starting from the predetermined sampling start position indicated by the sampling start pulse; and pulse conversion means for calculating data in the binary signal, which data are present in positions close to the respective positions calculated by the sampling position calculation means, and generating the sampling pulse that designates the calculated data positions as data sampling positions. Therefore, it is possible to provide a broadcast text data sampling apparatus that can precisely sample text data from plural types of text broadcastings having different transmission clock frequencies.

According to a sixth aspect of the present invention, in the broadcast text data sampling apparatus according to the third aspect, the sampling pulse generation means comprises: clock run-in position setting means for designating the position of a clock run-in period in the broadcast text signal; clock run-in cycle detection means for detecting the cycle of the clock run-in in the clock run-in period, from the binary signal; judgement means for judging the type of the broadcast text signal from the clock run-in cycle detected by the clock run-in cycle detection means, and outputting a text data sampling interval value which is predetermined according to the type of the broadcast text signal; sampling start period setting means for setting a sampling start period for setting the predetermined sampling start position, within a period in the vicinity of the position between the clock run-in and a framing code in the broadcast text signal; sampling start pulse generation means for detecting a change point at which the binary signal changes from 0 to 1 within the sampling start period, and generating a sampling start pulse indicating a sampling start position that is shifted from the change point by a first interval smaller than the sampling interval value; sampling position calculation means for sequentially calculating the positions in the binary signal, which positions are separated at intervals equal to the sampling interval value, starting from the position indicated by the sampling start pulse; and pulse conversion means for calculating data in the binary signal, which data are present in positions close to the respective positions, and generating a sampling pulse that designates the calculated data positions as data sampling positions; the phase error detection means comprises: phase error detection sampling start pulse generation means for detecting a change point at which the binary signal changes from 0 to 1, and generating a phase error detection sampling start pulse in a position that is shifted by the first interval from the change point; phase error detection period setting means for setting a period for phase error detection, including the phase error detection sampling start pulse generation position; phase error detection pulse generation means for detecting a phase error between the sampling pulse and the phase error detection sampling start pulse, depending on whether the sampling pulse is included in the phase error detection period or not, and when the phase error is detected, generating a phase error detection pulse in the phase error detection period in which the phase error is detected; phase error correction pulse generation means for outputting, as a phase error correction pulse, the phase error detection sampling start pulse that is included in the period during which the phase error detection pulse is generated; and sampling pulse selection signal output means for outputting a sampling pulse selection signal indicating that the phase error occurs, after the phase error detection pulse is generated; and the sampling pulse correction means comprises: phase error correction sampling pulse generation means for sequentially calculating the positions of data in the binary signal, which data are positioned at intervals close to the sampling interval value, starting from the phase error correction pulse, and calculating phase error corrected positions, and generating a pulse that designates the calculated data positions as data sampling positions; and corrected sampling pulse selection means for receiving the sampling pulse, and outputting the sampling pulse as a corrected sampling pulse when the sampling pulse selection signal is not inputted, while outputting the pulse generated by the corrected sampling pulse generation means, as a corrected sampling pulse, when the sampling pulse selection signal is inputted. Therefore, it is possible to provide a broadcast text data sampling apparatus that can reduce sampling error caused by phase error in the broadcast text signal, without increasing the circuit scale.

According to a seventh aspect of the present invention, in the broadcast text data sampling apparatus according to the fourth aspect, the sampling pulse generation means comprises: clock run-in position setting means for designating the position of a clock run-in period in the broadcast text signal; clock run-in cycle detection means for detecting the cycle of clock run-in in the clock run-in period, from the binary signal; judgement means for judging the type of the broadcast text signal from the clock run-in cycle detected by the clock run-in cycle detection means, and outputting a text data sampling interval value which is predetermined according to the type of the broadcast text signal; sampling start period setting means for setting a sampling start period for setting the predetermined sampling start position, within a period in the vicinity of the position between the clock run-in and a framing code in the broadcast text signal; sampling start pulse generation means for detecting a change point at which the binary signal changes from 0 to 1 within the sampling start period, and generating a sampling start pulse indicating a sampling start position that is shifted from the change point by a first interval smaller than the sampling interval value; synthesis means for synthesizing the sampling start pulse and the phase error correction pulse; sampling position calculation means for sequentially calculating the positions in the binary signal, which positions are separated at intervals equal to the sampling interval value, starting from the position indicated by the sampling start pulse and the phase error correction pulse which are outputted from the synthesis means; and pulse conversion means for calculating data in the binary signal, which data are present in positions close to the respective positions, and generating a sampling pulse that designates the calculated data positions as data sampling positions; and the phase error detection means comprises: phase error detection sampling start pulse generation means for detecting a change point at which the binary signal changes from 0 to 1, and generating a phase error detection sampling start pulse in a position that is shifted by the first interval from the change point; phase error detection period setting means for setting a period for phase error detection, in a position before and after the generation of the phase error detection sampling start pulse; phase error detection pulse generation means for detecting a phase error between the sampling pulse and the phase error detection sampling start pulse, depending on whether the sampling pulse is included in the phase error detection period or not, and when the phase error is detected, generating a phase error detection pulse in the phase error detection period in which the phase error is detected; and phase error correction pulse generation means for outputting, as a phase error correction pulse, the phase error detection sampling start pulse that is included in the period during which the phase error detection pulse is generated. Therefore, it is possible to provide a broadcast text data sampling apparatus that can reduce sampling error caused by phase error in the broadcast text signal, without increasing the circuit scale.

According to an eighth aspect of the present invention, a broadcast text data sampling method comprises: A/D conversion step of sampling a broadcast text signal supplied from the outside, with a sampling clock of a predetermined frequency, to convert the signal into digital data; binarization step of converting the digital data into a binary signal; sampling pulse generation step of detecting the cycle of clock run-in of the broadcast text signal from the binary signal, obtaining a text data sampling interval value on the basis of the clock run-in cycle, sequentially calculating the positions of data in the binary signal, which data are positioned at intervals close to the sampling interval value, starting from a predetermined sampling start position, and generating a sampling pulse that designates the calculated data positions as data sampling positions; and sampling step of sampling the text data from the binary signal on the basis of the sampling pulse. Therefore, it is possible to provide a broadcast text data sampling method by which text data can be precisely sampled from plural types of text broadcastings having different transmission clock frequencies.

According to a ninth aspect of the present invention, the broadcast text data sampling method according to the eighth aspect further comprises data interpolation step of receiving the digital data obtained in the A/D conversion step, and generating interpolation data for interpolating the digital data so that the amount of the data is multiplied by an integer; wherein the binarization step binarizes the digital data and the interpolation data, and outputs the binarized data as a binary signal; and the sampling pulse generation step sequentially calculates the positions of data within the binary signal obtained by binarizing the digital data and the interpolation data, which data are positioned at intervals close to the sampling interval value, starting from the sampling start position, and generates a sampling pulse that designates the calculated data positions as data sampling positions. Therefore, it is possible to provide a broadcast text data sampling method by which text data can be sampled with high precision.

According to a tenth aspect of the present invention, a broadcast text data sampling method comprises: A/D conversion step of sampling a broadcast text signal which is supplied from the outside and has a predetermined transmission clock frequency, with a sampling clock of a predetermined frequency, to convert the signal into digital data; binarization step of converting the digital data into a binary signal; sampling pulse generation step of calculating a text data sampling interval value on the basis of the predetermined transmission clock frequency, sequentially calculating the positions of data in the binary signal, which data are positioned at intervals close to the sampling interval value, from the sampling interval value, starting from a predetermined sampling start position, and generating a sampling pulse that designates the calculated data positions as data sampling positions; and sampling step of sampling the text data from the binary signal on the basis of the sampling pulse. Therefore, it is possible to provide a broadcast text data sampling method by which text data can be sampled without generating sampling error even when the data in the clock run-in period have gone.

According to an eleventh aspect of the present invention, the broadcast text data sampling method according to the tenth aspect further comprises data interpolation step of receiving the digital data obtained in the A/D conversion step, and generating interpolation data for interpolating the digital data so that the amount of the data is multiplied by an integer; wherein the binarization step binarizes the digital data and the interpolation data, and outputs the binarized data as a binary signal; and the sampling pulse generation step sequentially calculates the positions of data within the binary signal obtained by binarizing the digital data and the interpolation data, which data are positioned at intervals close to the sampling interval value, starting from the sampling start position, and generates a sampling pulse that designates the calculated data positions as data sampling positions. Therefore, it is possible to provide a broadcast text data sampling method by which text data can be sampled with high precision.

According to a twelfth aspect of the present invention, the broadcast text data sampling method according to any of the eighth to eleventh aspect further comprises: phase error detection step of detecting a change point of the binary signal, generating a phase error detection sampling start pulse for phase error detection, on the basis of the change point and the sampling interval value, comparing the phase error detection sampling start pulse with the sampling pulse, and when a phase error is detected, outputting a phase error correction pulse indicating the position where the phase error occurs, and a sampling pulse selection signal indicating that the phase error occurs; and sampling pulse correction step of receiving the sampling pulse, when the sampling pulse selection signal is not outputted from the phase error detection step, outputting the sampling pulse as a corrected sampling pulse, when the sampling pulse selection signal is outputted, sequentially calculating the positions of data within the binary signal, which data are positioned at intervals close to the sampling interval value, starting from the position that is indicated by the phase error correction pulse outputted from the phase error detection step, and generating a pulse that designates the calculated data positions as data sampling positions, and outputting this pulse as a corrected sampling pulse; wherein the sampling step samples the text data on the basis of the corrected sampling pulse. Therefore, even when a phase error occurs in the broadcast text signal, phase-error-corrected sampling can be performed, thereby providing a broadcast text data sampling method that can reduce the sampling error.

According to a thirteenth aspect of the present invention, the broadcast text data sampling method according to any of the eighth to eleventh aspects further comprises: phase error detection step of detecting a change point of the binary signal, generating a phase error detection sampling start pulse for phase error detection, on the basis of the change point and the sampling interval value, comparing the phase error detection sampling start pulse with the sampling pulse, and when a phase error is detected, outputting a phase error correction pulse indicating the position where the phase error occurs; wherein, after the phase error correction pulse is inputted, the sampling pulse generation step sequentially calculates the positions of data within the binary signal, which data are positioned at intervals closest to the sampling interval value, starting from the position indicated by the phase error correction pulse, and generates a pulse that designates the calculated data positions as data sampling positions, and outputs this pulse as a sampling pulse to the sampling means. Therefore, it is possible to provide a broadcast text data sampling method that can reduce sampling error caused by phase error in the broadcast text signal.

BRIEF DESCRIPTION OF THE DRAWINGS

FIG. 28 is a table illustrating the types of text broadcastings, for explaining the conventional broadcast text data sampling apparatus.

DETAILED DESCRIPTION OF THE PREFERRED EMBODIMENTS

[Embodiment 1]

Figure 1:
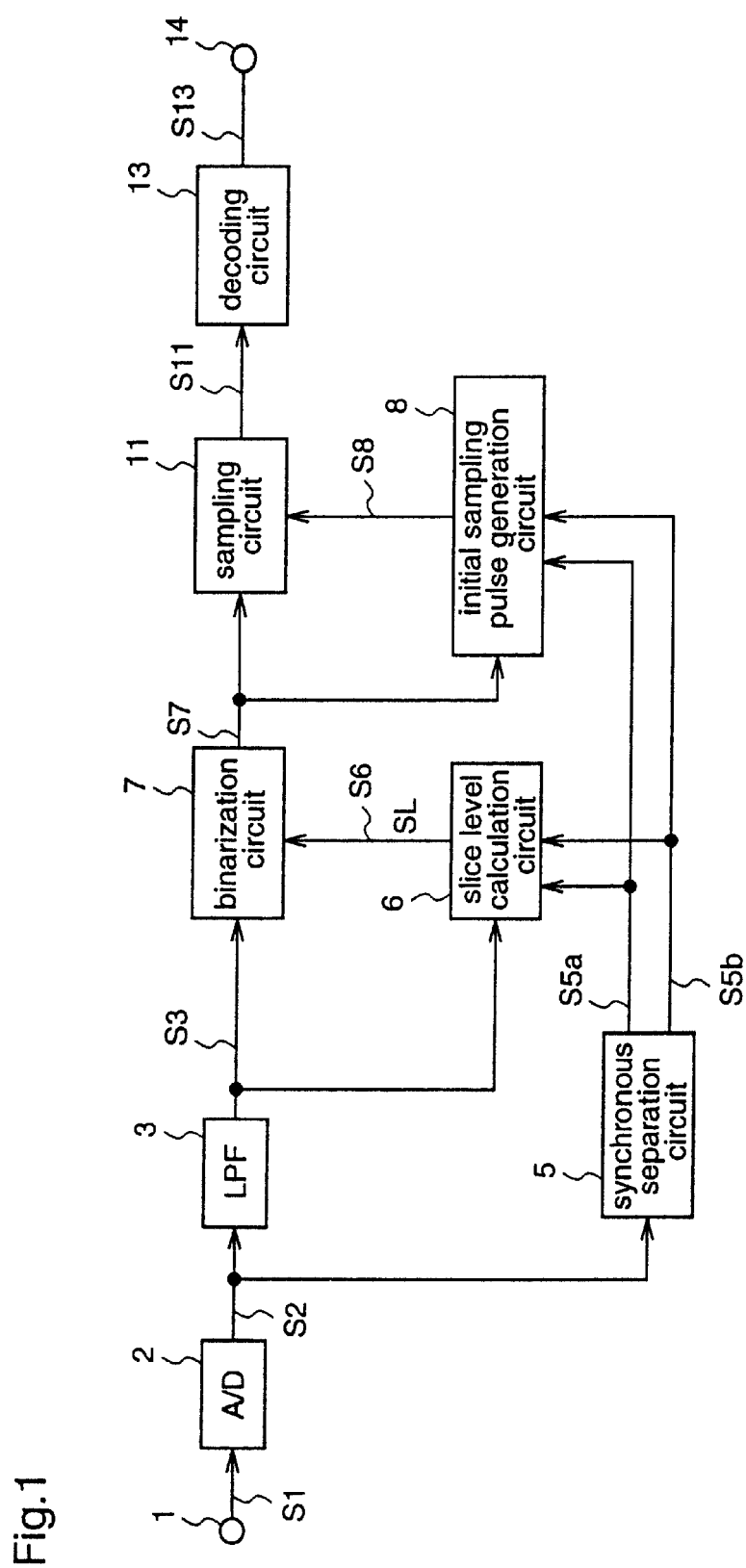
FIG. 1 is a block diagram illustrating the construction of a broadcast text data sampling apparatus according to a first embodiment of the present invention.
Figure 2:
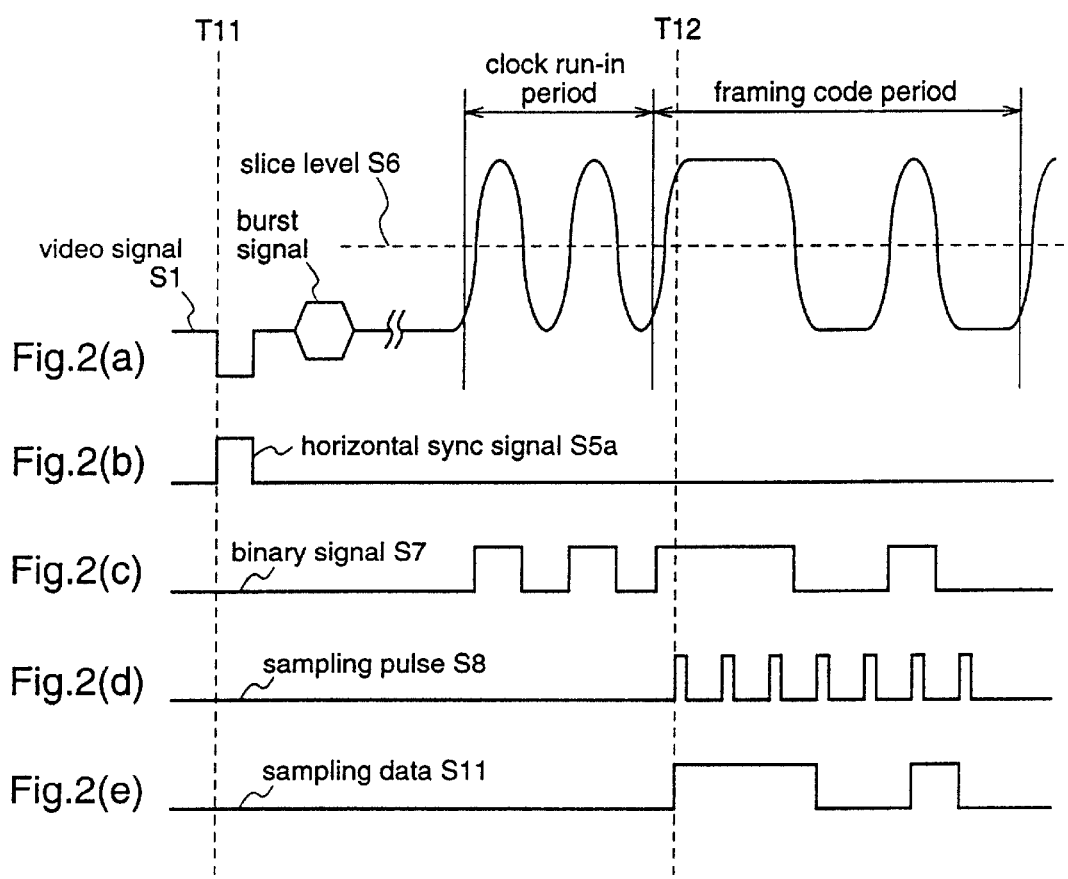
FIGS. 2(a)–2(e) are timing charts for explaining the operation of the broadcast text data sampling apparatus of the first embodiment.

FIG. 1 is a block diagram illustrating the construction of a broadcast text data sampling apparatus according to a first embodiment of the present invention. An analog video signal S1, in which text data is superimposed in the vertical blanking period, is inputted through a video signal input terminal 1. An A/D converter 2 converts the analog video signal into a digital signal S2 using a predetermined sampling clock fs(MHz). For example, the operating clock of this data sampling apparatus is used as the sampling clock fs. A low-pass filter 3 performs noise removal from the digital signal S2. A synchronous separation circuit 5 separates a vertical sync signal S5b and a horizontal sync signal S5a from the digital signal S2. The separated vertical sync signal S5b and horizontal sync signal S5a are used to obtain the positions of text data, clock run-in, and the like, in a slice level calculation circuit 6 and an initial sampling pulse generation circuit 8. The slice level calculation circuit 6 calculates an optimum slice level from text data in a predetermined line and a predetermined position in the digital signal S3. A binarization circuit 7 converts the noise-removed digital signal S3 into a binary signal S7 of 0 or 1, using the slice level S6 calculated by the slice level calculation circuit 6.

The initial sampling pulse generation circuit 8 receives the binary signal S7, and calculates a clock-run-in cycle, with the number of sampling clocks as a unit, within a clock run-in period of a predetermined line. The position of the clock run-in is obtained on the basis of the vertical sync signal S5b and the horizontal sync signal S5a. The initial sampling pulse generation circuit 8 holds the frequencies of transmission clocks according to the types of teletext broadcastings, and the frequency of the sampling clock used for A/D conversion, and judges the type of text broadcasting on the basis of the calculated clock run-in cycle, and then calculates a sampling pulse interval value that is required for sampling pulse generation, with the number of sampling clocks as a unit, from the transmission clock cycle of the judged text broadcasting. Since the cycle of sampling text data from the binary signal S7 may be equal to the cycle of the transmission clock of the text signal, a value which is obtained by calculating the cycle of the transmission clock of the judged text broadcasting with the number of sampling clocks as a unit, becomes a sampling pulse interval value.

Further, the initial sampling pulse generation circuit 8 sets a text data sampling start position, in the vicinity of the position between the clock run-in period and the framing code period that follows the clock run-in period. Then, the initial sampling pulse generation circuit 8 sequentially calculates, starting from the sampling start position, the positions of data in the binary signal S7 which are positioned at intervals closest to the sampling interval value, and then generates an initial sampling pulse S8 for designating the calculated data positions as data sampling positions.

A sampling circuit 11 samples text data S11 from the binary signal S7 on the basis of the initial sampling pulse S8. A decoding circuit 13 converts the serial text data S11 sampled by the sampling circuit 11 into parallel data, and subjects the parallel data to a decoding process, such as error correction, according to the type of the text broadcasting. An output terminal 14 transmits the decoded data S13 to a display circuit (not shown), wherein display according to the type of the text broadcasting is carried out.

FIGS. 2(a)–2(e) are timing charts for explaining the operation of the broadcast text data sampling apparatus according to the first embodiment. Hereinafter, the operation of the data sampling apparatus will be described with reference to FIG. 1 and FIGS. 2(a)–2(e). In this first embodiment, the type of text broadcasting is teletext broadcasting.

FIG. 2(a) shows an analog video signal S101 on which text data of teletext broadcasting is superimposed, inputted through the video signal input terminal 101. The analog video signal S101 includes a horizontal sync signal, a burst signal such as a luminance signal or the like, a clock run-in, a framing code indicating the type of text broadcasting or the like, and teletext data.

As shown in FIG. 2(b), at time T11, the synchronous separation circuit 5 separates the horizontal sync signal S5a from the digital signal S2 that is obtained by digitizing the analog video signal S1 in the A/D converter 2.

Then, the signal S3, which is obtained by removing noise from the digital signal S2 by the low-pass filter 3, is binarized by the binarization circuit 7 on the basis of the slice level S6 calculated by the slice level calculation circuit 6, thereby generating a binary signal S7 shown in FIG. 2(c).

Next, a change point T12a at which the binary signal S7 changes from 0 to 1 is detected in the vicinity of the position between the clock run-in and the framing code, and time T12 that is shifted backward from the change point T12a by a predetermined period, is obtained. This time T12 is regarded as the start position of the initial sampling pulse S8. The interval shifted from the change point T12a (hereinafter, referred to as a first interval) is determined on the basis of the sampling pulse interval value that is determined by the initial sampling pulse generation circuit 8 according to the type of the text broadcasting, and a value smaller than the sampling pulse interval value is adopted as the first interval. In the vicinity of the change point T12a at which the binary signal S7 changes from 0 to 1, if slight phase error occurs in the teletext data, the value of the binary signal S7 changes, whereby the value of the sampled data differs completely. In order to avoid this, the sampling start position is set at a position that is shifted by the first interval from the change point T12a. In this first embodiment, especially, the start position is shifted by ½ of the sampling pulse interval value.

Then, as shown in FIG. 2(d), generation of the initial sampling pulse S8 is started from the start position of the initial sampling pulse S8, on the basis of the sampling pulse interval value.

The sampling circuit 11 samples text data from the binary signal S7 on the basis of the initial sampling pulse S8. The sampled data S11 are shown in FIG. 2(e).

Figure 3:
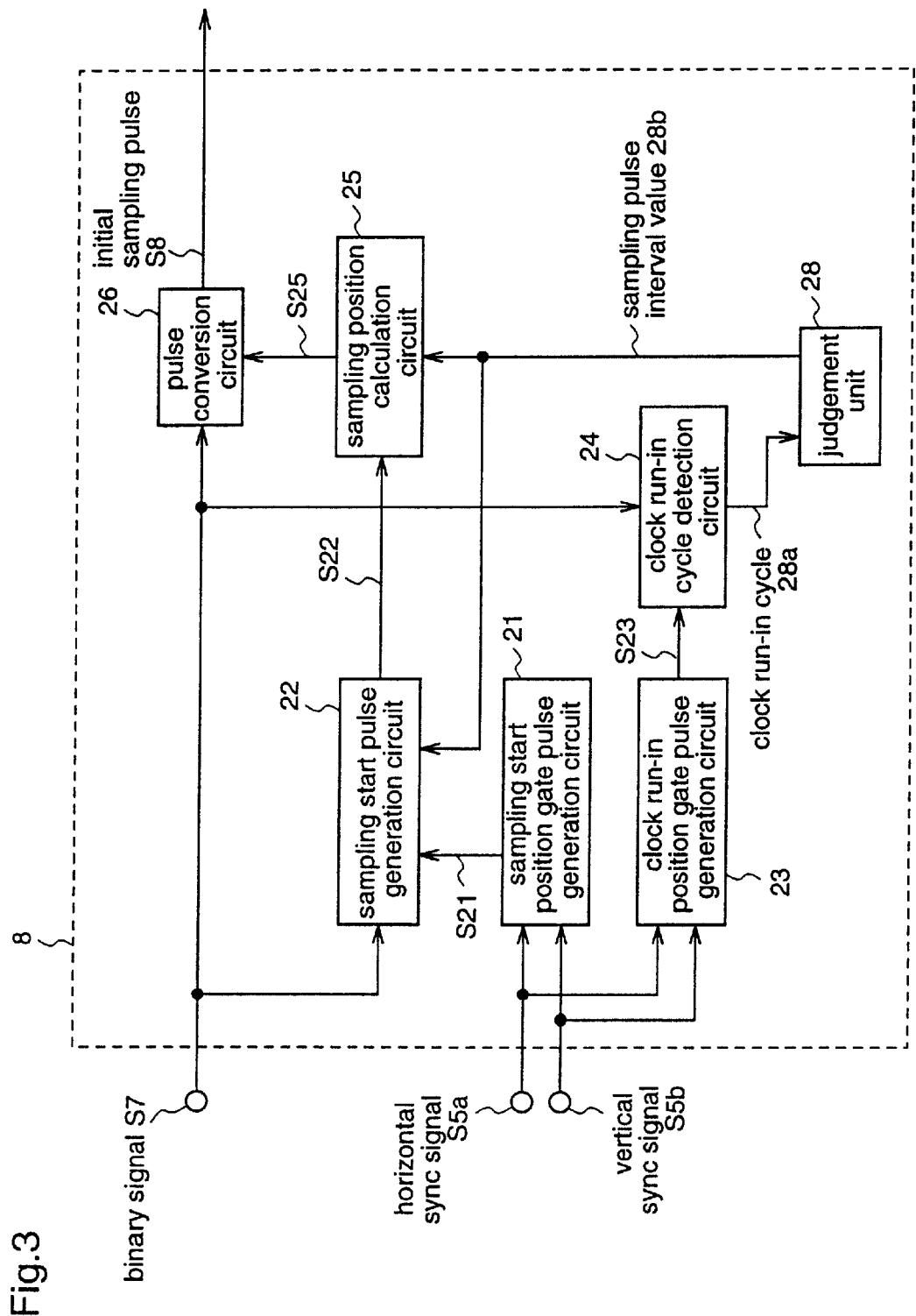
FIG. 3 is a block diagram illustrating the construction of an initial sampling pulse generation circuit included in the broadcast text data sampling apparatus of the first embodiment.
Figure 4:
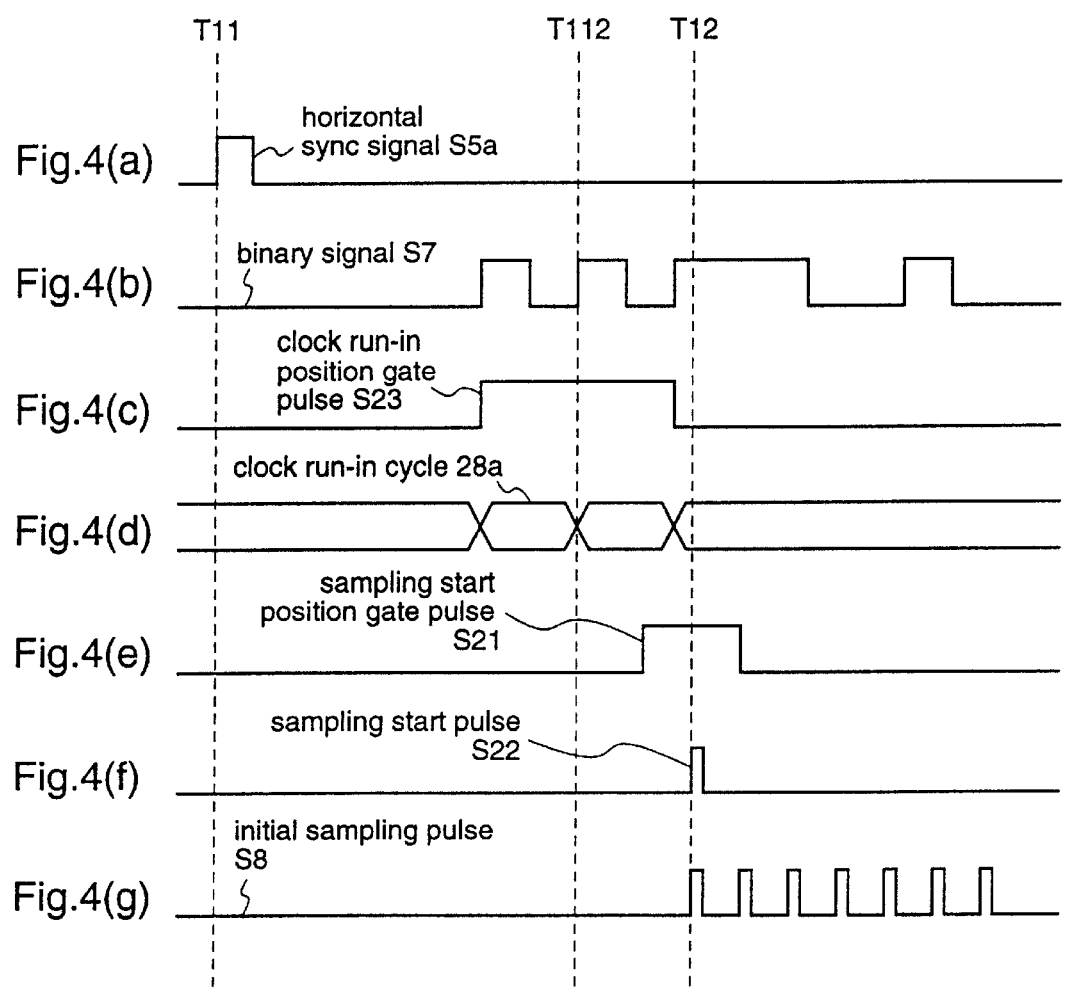
FIGS. 4(a)–4(g) are timing charts for explaining the operation of the initial sampling pulse generation circuit according to the first embodiment.

FIG. 3 is a block diagram illustrating the internal construction of the initial sampling pulse generation circuit 8. In FIG. 1, the same reference numerals as those shown in FIG. 1 designate the same or corresponding parts. A sampling start position gate pulse generation circuit 21 is means to set a sampling start period for setting the sampling start position. This circuit 21 receives the horizontal sync signal S5a and the vertical sync signal S5b, detects the position between the clock run-in period and the framing code period using these signals S5a and S5b, and generates a sampling start position gate pulse S21 of a predetermined period between the clock run-in period and the framing code period. A clock run-in position gate pulse generation circuit 23 is means to set a clock run-in position. This circuit 23 receives the horizontal sync signal S5a and the vertical sync signal S5b, and generates a clock run-in position gate pulse S23 of the same length as the clock run-in period, for indicating the position of the clock run-in period, using these signals S5a and S5b.

A clock run-in period detection circuit 24 detects change points at which the binary signal S7 changes from 0 to 1, within the period during which the clock run-in position gate pulse is being outputted, and transmits the number of sampling clocks between the change points as a clock run-in period 28a to a judgement unit 28.

The judgement unit 28 holds the sampling frequency employed by the A/D converter 2, and transmission clock frequencies corresponding to the types of plural text broadcastings that are likely to be inputted to the video signal input terminal 1. Using these frequencies, the judgement unit 28 judges the type of text broadcasting by specifying a text broadcasting having the transmission clock cycle closest to the clock run-in cycle 28a obtained by the clock run-in cycle detection circuit 24, and obtains the cycle of the transmission clock corresponding to the judged text broadcasting. Then, the judgement unit 28 calculates a sampling pulse interval value 28b that matches the obtained transmission clock cycle, using the number of sampling clocks as a unit, and then outputs the sampling pulse interval value 28b. When the detection of the clock run-in cycle by the clock run-in period detection circuit 24 is highly precise, since the clock run-in cycle becomes equal to the transmission clock cycle, i.e., the sampling interval value, the judgement unit 28 may be dispensed with. However, since there is a possibility that the clock run-in cycle detected by the clock run-in cycle detection circuit 24 includes an error, it is desirable that the judgement unit 28 judges the type of text broadcasting having the transmission clock cycle closest to the clock run-in cycle to output the precise sampling interval value 28b. To be employed as the judgement unit 28 are a processor, a register that outputs a sampling pulse interval value calculated in advance according to the inputted clock run-in cycle, and the like.

A sampling start pulse generation circuit 22 generates a sampling start pulse S22 indicating the sampling start position, on the basis of the sampling pulse interval value 28b according to the type of text broadcasting supplied from the judgement unit 28, within the period during which the sampling start position gate pulse S21 is being outputted. To be specific, a change point at which the binary signal S7 changes from 0 to 1 is detected within the period of the sampling start position gate pulse S21, and a sampling start pulse S22 is generated at a position that is shifted backward from the change point by the above-mentioned first interval.

A sampling position calculation circuit 25 sequentially calculates sampling positions S25 at the sampling pulse interval value 28b, starting from the position of the sampling start pulse S22. The unit of each sampling position S25 is the number of sampling clocks.

A pulse conversion circuit 26 optimizes each sampling position S25. That is, when the value of the sampling position S25 is a decimal, the pulse conversion circuit 26 converts the value into an integer. The reason is as follows. The binary signal S7 is sampled in units of sampling clocks and, therefore, the interval between adjacent sampled data in the binary signal S7 is an integer in units of sampling clocks. Then, on the basis of the sampling positions S25 converted to integers, the pulse conversion circuit 26 generates an initial sampling pulse S8 for indicating the positions of data to be sampled from the binary signal S7, and outputs it to the sampling circuit 11.

FIGS. 4(a)–4(g) are timing charts for explaining the operation of the initial sampling pulse generation circuit 8. In FIG. 4, the same reference numerals as those shown in FIG. 2 designate the same or corresponding parts. Hereinafter, the operations of the respective blocks in the initial sampling pulse generation circuit 8 will be described with reference to FIG. 3 and FIGS. 4(a)–4(g).

As shown in FIG. 4(a), at time T11, the horizontal sync signal S5a is separated. At time T112, change points, at which the binary signal S7 shown in FIG. 4(b) changes from 0 to 1, are detected within the period during which the clock run-in position gate pulse S23 shown in FIG. 4(c) is being outputted. The number of sampling clocks between the change points in the clock run-in period is regarded as the clock run-in cycle 28a shown in FIG. 4(d).

At time T12 within the sampling start position gate pulse S21 that is set in the vicinity of the position between the clock run-in period and the framing code period shown in FIG. 4(e), a sampling start pulse S22 is generated as shown in FIG. 4(f), on the basis of the binary signal S7 and the sampling pulse interval value 28b that is obtained according to the type of text broadcasting that is judged basis of the clock run-in period 28a. To be specific, the sampling start pulse S22 is generated at a position that is shifted from the 0-to-1 change point of the binary signal S7, by the first interval, i.e., ½ of the sampling pulse interval value 28b.

A sampling position calculation circuit 25 calculates sampling positions on the basis of the sampling pulse interval value 28b, starting from the sampling start pulse S22 generated at time T12, and the pulse conversion circuit 26 generates the initial sampling pulse S8 shown in FIG. 4(g).

Figure 5:
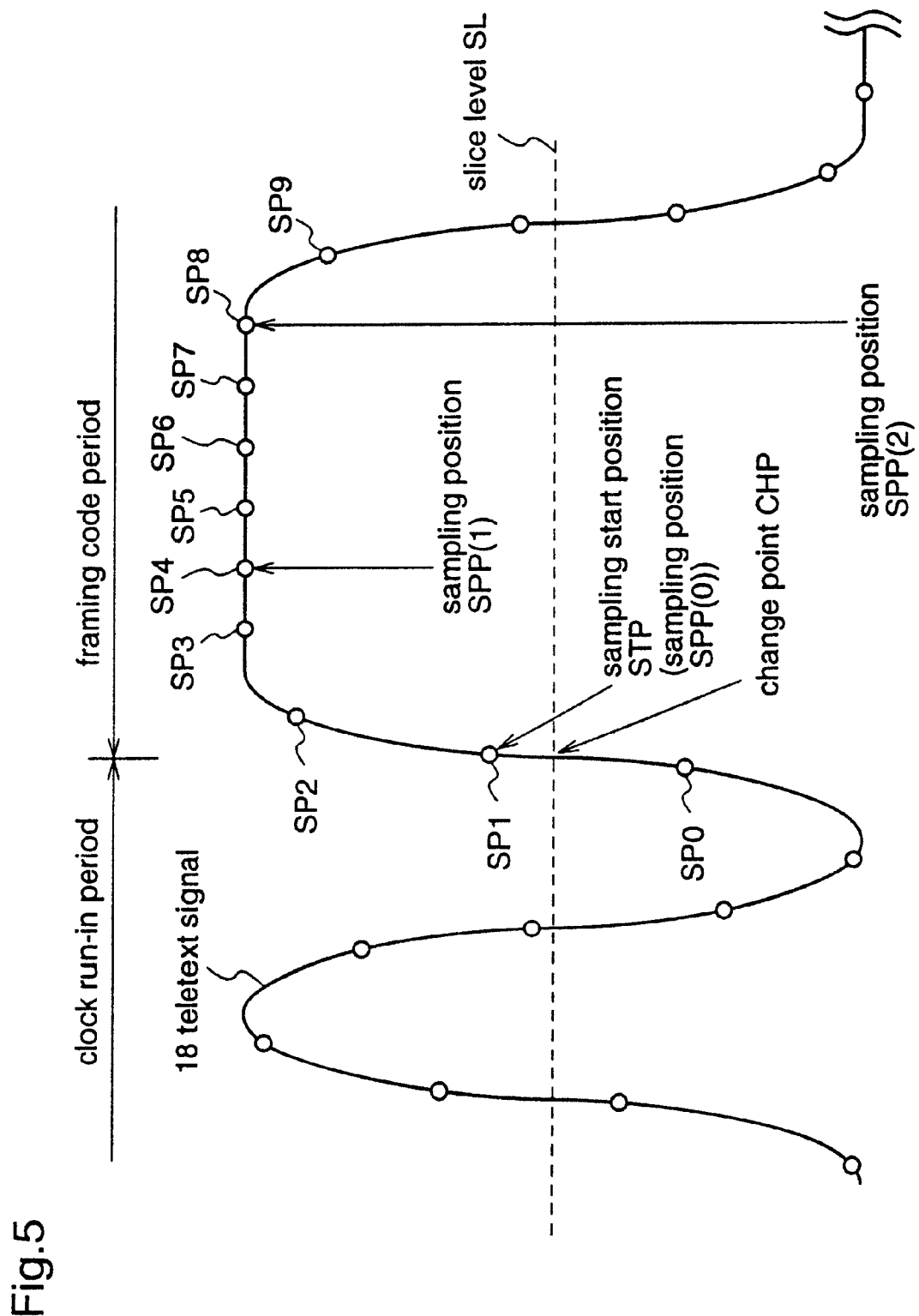
FIG. 5 is a schematic diagram for explaining the operation of the initial sampling pulse generation circuit according to the first embodiment.

FIG. 5 is a schematic diagram illustrating the relationship between a broadcast text signal and sampled text data, for explaining the operation of the initial sampling pulse generation circuit 8 more specifically. It is assumed that the text signal is a teletext signal used in Europe, having the largest amount of data and the fastest transmission clock. In FIG. 5, SPt (t: integer not less than 0) shown by white dots are signal data which are obtained by converting the teletext signal 18 having a transmission clock of 6.9375 MHz into a digital signal, using a sampling clock fs(MHz) of 24 MHz.

Hereinafter, the operation of the initial sampling pulse generation apparatus will be described specifically with reference to FIG. 5.

Initially, a change point CHP at which the binary signal S7 changes from 0 to 1 is detected within the sampling start position gate pulse period in the vicinity of the position between the clock run-in period and the framing code period. The clock run-in cycle detection circuit 24 obtains a clock run-in period 28a, in units of sampling clocks, using the change point CHP. Then, the judgement unit 28 obtains a sampling pulse interval value 28b from the clock run-in cycle 28a. Assuming that the type of the text broadcast is precisely detected (i.e., the transmission clock is precisely detected), the sampling pulse interval value 28b becomes 3.4595 with the number of sampling clocks as a unit.

Then, the sampling start pulse generation circuit 22 sets a sampling start position STP at a position that is about ½ of the sampling pulse interval value 28b shifted backward from the change point CHP. The ½ of the sampling pulse interval value 28b is 1.7297, based on the number of sampling clocks. Since sampling points should be integers, the sampling start position STP becomes 1 by discarding the fractional portion of 1.7297 from the change point CHP. Although the fractional portion of 1.7297 is discarded, it may be rounded off to the nearest integer, or rounded up, with the same effect as mentioned above. In FIG. 5, the change point CHP corresponds to data SP0, and the position of data SP1 that is placed by one point to the right of the data SP0 corresponds to the sampling start position STP. That is, phase matching to the transmission clock of the teletext signal is performed by calculating the sampling start position STP.

Thereafter, the sampling position calculation circuit 25 sequentially calculates the positions of data iii the binary signal, which data are positioned at intervals closest to the sampling pulse interval value 28b, starting from the sampling start position STP. As shown in FIG. 5, the sampling position SPP(0) corresponds to the sampling start position STP, and sampling data SPP(i) are sequentially calculated. The SPP(i) shows the i-th (i: integer not less than 0) sampling data. In this first embodiment, the sampling positions SPP(i) are calculated at the sampling intervals of 3.4595. However, since the sampling interval is a decimal, each sampling position SPP(i) is also expressed by a decimal. Accordingly, as data to be sampled, a binary signal SPt that is closest to the calculated sampling position SPP(i) is selected. The data to be selected exists at a position obtained by discarding the fractional portion of the sampling position SPP(i). Since the values obtained by discarding the fractional portions of 3.4595×1 and 3.4595×2 are 3 and 7, respectively the third data SP4, the seventh data SP8, . . . from the sampling start position STP are designated as sampling positions SPP(1), SPP(2), . . . , respectively. Although the fractional portion is discarded, it may be rounded off to the nearest integer, or rounded up, with the same effect as mentioned above. Further, sampling of data may be carried out at intervals of a value obtained by discarding the fractional portion of the sampling interval value 28b. In this way, the initial sampling pulse generation circuit 8 generates, starting from the sampling start position STP, an initial sampling pulse S8 that designates the positions of sampling data closest to the respective sampling positions SPP(i) that are separated at intervals of the sampling pulse interval value 28b, whereby precise data sampling adapted to the teletext signal is carried out.

Further, even when the broadcast text signal is not the teletext signal, precise data sampling is carried out by, as mentioned above, judging the type of text broadcasting, calculating a sampling pulse interval value 28b according to the type, and generating an initial sampling pulse S8 on the basis of the sampling pulse interval value 28b.

As described above, according to the first embodiment of the present invention, in the initial sampling pulse generation circuit 8, the clock run-in cycle 28a is obtained in units of sampling clocks, and the type of text broadcasting is judged from the clock run-in cycle 28a to generate the sampling pulse interval value 28b in units of sampling clocks according to the type of text broadcasting. Then, the positions of data in the binary signal S7, which data are positioned at intervals closest to the sampling pulse interval value 28b, are calculated, and the initial sampling pulse S8 for designating the positions as data sampling positions is generated, and data are sampled from the binary signal S7 on the basis of the initial sampling pulse S8. Therefore, text data can be sequentially sampled from the binary signal S7 at sampling intervals according to the type of the text broadcasting that is judged from the clock run-in, whereby text data can be precisely sampled from plural types of text broadcastings having different transmission clock frequencies.

To be specific, the text data sampling apparatus of this first embodiment detects the cycle of clock run-in, judges the type of text broadcasting from the clock run-in cycle, calculates a sampling pulse interval value according to the type of text broadcasting, and extracts text data from data sampled on the basis of the sampling pulse interval value. Therefore, if only a sampling clock is determined, the text data sampling apparatus can perform data sampling on, not only teletext broadcasting in Europe, but also VPS and WSS in Europe, multiplexed teletext broadcasting in Japan, and closed caption broadcasting in the United States. Thus, the text data sampling apparatus of this first embodiment can deal with text broadcastings all over the world.

[Embodiment 2]

Figure 6:
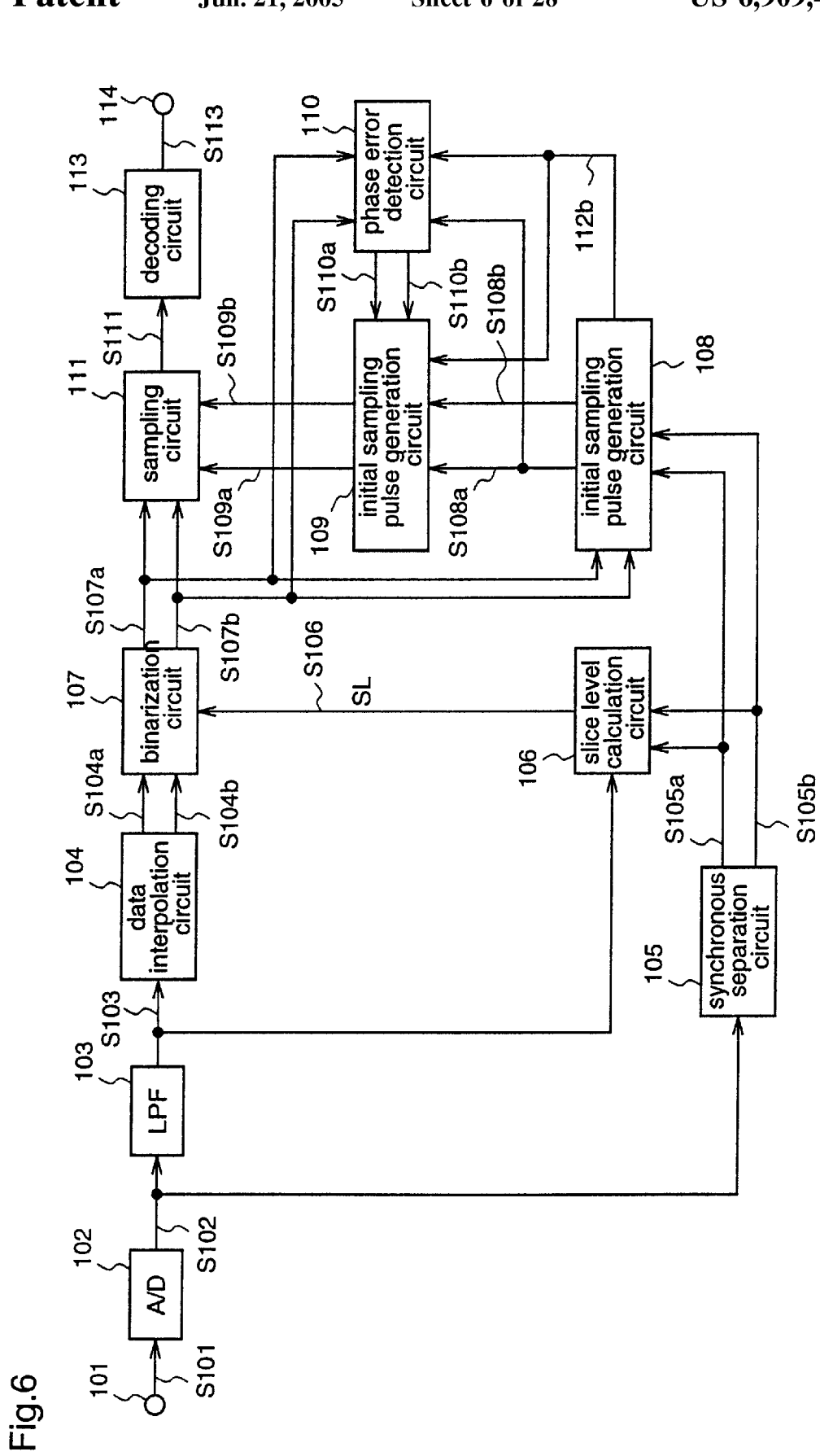
FIG. 6 is a block diagram illustrating the construction of a broadcast text data sampling apparatus according to a second embodiment of the present invention.
Figure 7:
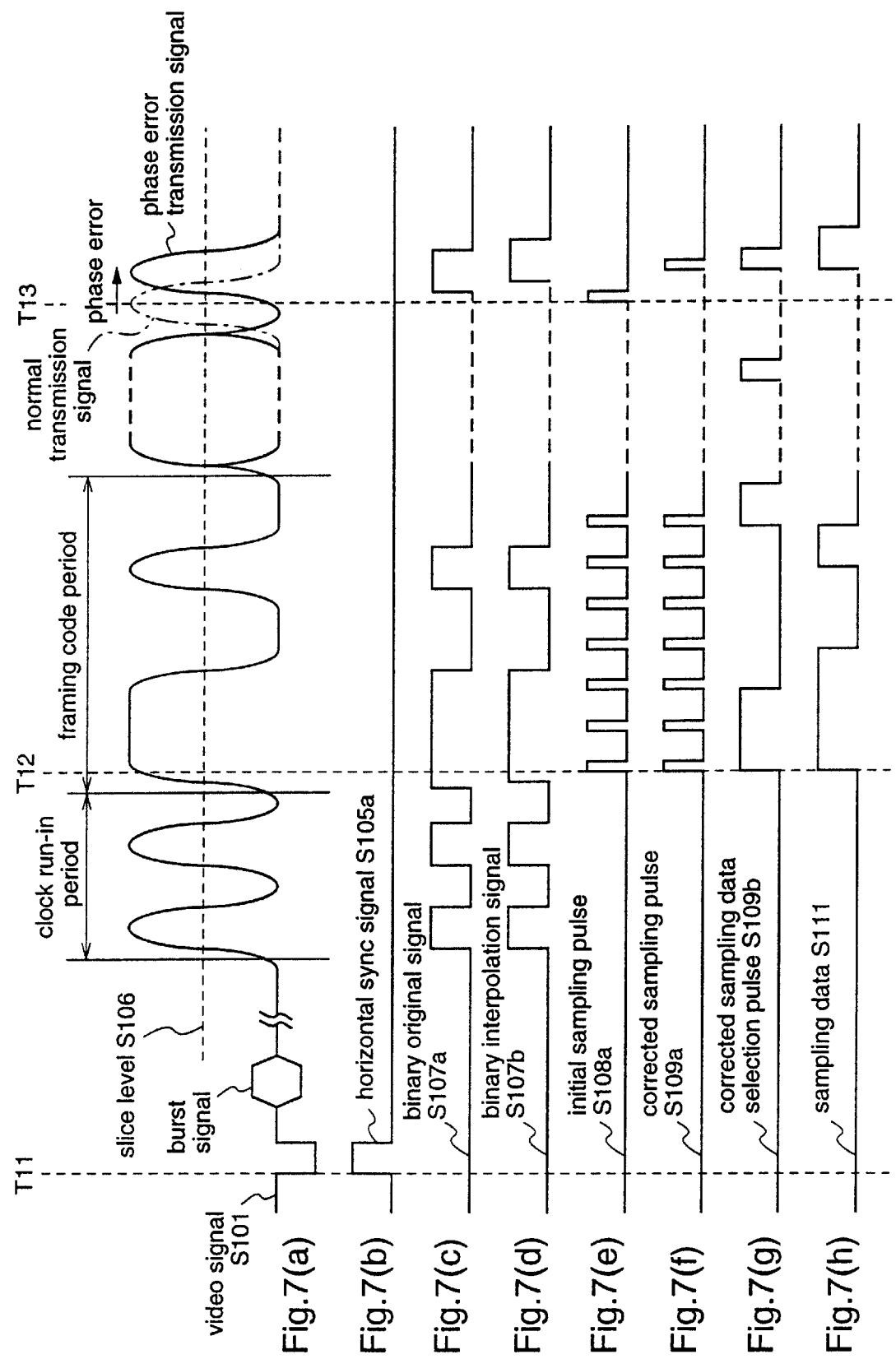
FIGS. 7(a)–7(h) are timing charts for explaining the operation of the broadcast text data sampling apparatus of the second embodiment.

FIG. 6 is a block diagram illustrating the construction of a broadcast text data sampling apparatus according to a second embodiment of the present invention. An analog video signal S101, in which broadcast text data is superposed on a vertical blanking period, is inputted through a video signal input terminal 101. An A/D converter 102 converts the analog video signal into a digital signal S102 using a predetermined sampling clock fs(MHz). The operating clock of this broadcast text data sampling apparatus or the like is used as the sampling clock fs. In this second embodiment, a sampling clock having a sampling frequency of 24 MHz is used. A low-pass filter 103 performs noise removal from the digital signal S102. A data interpolation circuit 104 generates an original signal S104a and an interpolation signal S104b that interpolates the original signal S104a so that the amount of data is multiplied by α (α: integer), from the signal S103 after noise removal by the low-pass filter 103.

A synchronous separation circuit 105 separates a horizontal sync signal S105a and a vertical sync signal S105b from the digital signal S102. The separated horizontal sync signal S105a and vertical sync signal S105b are used to obtain the positions of text data, clock run-in, etc. in a slice level calculation circuit 106 and an initial sampling pulse generation circuit 108. The slice level calculation circuit 106 calculates an optimum slice level S106 from text data in a predetermined line and a predetermined position in the digital signal S103. A binarization circuit 107 converts the original signal S104a and the interpolation signal S104b, which are generated in the data interpolation circuit 104, into a binary original signal S107a of 1 or 2 and a binary interpolation signal S107b of 1 or 2, respectively, by the slice level S106 calculated by the slice level calculation circuit 106.

An initial sampling pulse generation circuit 108 receives the binary original signal S107a and the binary interpolation signal S107b, and calculates a clock run-in cycle, using the number of sampling clocks as a unit, within a clock run-in period of a predetermined line. The position of the clock run-in in the predetermined line is obtained on the basis of the horizontal sync signal S105a and the vertical sync signal S105b. Further, the initial sampling pulse generation circuit 108 holds the frequencies of transmission clocks corresponding to the plural types of text broadcastings, the frequency of the sampling clock used for A/D conversion, and the interpolation cycle used for data interpolation. The initial sampling pulse generation circuit 108 judges the type of text broadcasting on the basis of the calculated clock run-in cycle, and calculates a sampling pulse interval value 112b that is required for sampling pulse generation, with the number of sampling clocks as a unit, from the cycle of the transmission clock corresponding to the judged type of text broadcasting. Since the cycle of sampling text data from the binarized text signal may be equal to the cycle of the transmission clock of the text signal, a value, which is obtained by calculating the cycle of the transmission clock of the judged text broadcasting based on the number of sampling clocks, becomes a sampling pulse interval value 112b.

Further, the initial sampling pulse generation circuit 108 sets a text data sampling start position, in the vicinity of the position between the clock run-in period and the framing code period that follows the clock run-in period. Then, the initial sampling pulse generation circuit 108 sequentially calculates, starting from the sampling start position, the positions of data in the binary original signal S107a and the binary interpolation signal S107b, which data are positioned at intervals closest to the sampling interval value 112b. Thereafter, the initial sampling pulse generation circuit 108 generates an initial sampling pulse S108a designating the calculated data positions as data sampling positions, and an initial sampling data selection pulse S108b indicating which data is to be sampled according to the initial sampling pulse S108a, between the data of the binary original signal S107a and the data of the binary interpolation signal S107b. The respective constituents of the initial sampling pulse generation circuit 108 will be later described.

A phase error detection circuit 110 receives the binary original signal S107a, the binary interpolation signal S107b, the initial sampling pulse S108a generated in the initial sampling pulse generation circuit 108, and the sampling pulse interval value 112b. Using these inputs, the phase error detection circuit 110 detects phase error in the text signal, and generates a phase error correction pulse S110a indicating the position where phase error is detected, and a sampling pulse selection signal S110b for selecting, as a sampling pulse after phase error detection, a sampling pulse to be corrected on the basis of the phase error correction pulse S110a. Detection of phase error is carried out as follows. Change points of the binary signal S107 (in this embodiment, change points from 0 to 1) are sequentially detected, and a phase error detection sampling start pulse for detecting phase error is generated in a position that is shifted from each change point by a predetermined time corresponding to the sampling pulse interval value 112b. Then, the phase error detection sampling start pulse is compared with the initial sampling pulse S108a, and when there is a phase difference larger than a predetermined value, it is decided that a phase error occurs, and the phase error detection sampling start pulse in the position where the phase error occurs is outputted as a phase error correction phase S110a. The constituents of the phase error detection circuit 110 will be described later.

A sampling pulse correction circuit 109 receives the phase error correction pulse S110a and the sampling pulse selection signal S110b from the phase error detection circuit 110, and the initial sampling pulse S108 and the sampling pulse interval value 112b from the initial sampling pulse generation circuit 108. When no phase error occurs, i.e., when no sampling pulse selection signal S110b is inputted to the sampling pulse correction circuit 109, the circuit 109 outputs the initial sampling pulse S108 as a corrected sampling pulse S109a. Further, the sampling pulse correction circuit 109 outputs the initial data sampling pulse S108b as a corrected data sampling pulse S109b. When a phase error is detected, i.e., when the sampling pulse selection signal S110b is inputted to the sampling pulse correction circuit 109, the circuit 109 generates, as a corrected sampling pulse S109a, a pulse obtained by correcting the initial sampling pulse S108 instead of the initial sampling pulse S108, and generates, as a corrected data sampling pulse S109b, a pulse obtained by correcting the initial data sampling pulse S108b, after the position where the phase error is detected. The constituents of the sampling pulse correction circuit 109 will be described later.

A sampling circuit 111 samples text data S111 on the basis of the corrected sampling pulse S109a, while selecting either the binary original signal S107a or the binary interpolation signal S107b on the basis of the corrected data sampling selection pulse S109b.

A decoding circuit 113 converts the serial text data S111 that is sampled by the sampling circuit 111 into parallel data, and subjects the parallel data to decoding processes such as error correction according to the type of the text broadcasting. An output terminal 114 sends the decoded data S113 to a display circuit (not shown), wherein display according to the type of text broadcasting is carried out.

FIGS. 7(a)–7(h) are timing charts for explaining the operation of the broadcast text data sampling apparatus according to the second embodiment of the invention. Hereinafter, the operation of the broadcast text data sampling apparatus as a whole will be described with reference to FIG. 6 and FIGS. 7(a)–7(h). In this second embodiment, the type of text broadcasting is teletext broadcasting, and the data interpolation circuit 104 employs double interpolation by which the amount of data including the original signal and the interpolation signal is doubled.

FIG. 7(a) shows an analog video signal S101 on which text data of teletext broadcasting is superposed, inputted through the video signal input terminal 101. The analog video signal S101 includes a horizontal sync signal, a burst signal such as a luminance signal or the like, a clock run-in, a framing code indicating the type of text broadcasting or the like, and teletext data.

As shown in FIG. 7(b), at time T11, the horizontal sync signal S105a is separated from the digital signal S102 which is obtained by digitizing the analog video signal S101 by the A/D converter 102, by the synchronous separation circuit 105.

Then, in the data interpolation circuit 104, an original signal S104a and an interpolation signal S104b are generated from a signal S103 that is obtained by removing noise from the digital signal S102 by the low-pass filter 103, and these signals are binarized in the binarization circuit 107 on the basis of the slice level S106 calculated by the slice level calculation circuit 106, thereby generating a binary original signal S107a shown in FIG. 7(c) and a binary interpolation signal S107b shown in FIG. 7(d).

Next, in the initial sampling pulse generation circuit 108, a change point 112a at which the binary original signal S107a and the binary interpolation signal S107b change from 0 to 1, is detected in the vicinity of the position between the clock run-in and the framing code. Then, a time T12 which is shifted backward from the change point T12a by the first interval described for the first embodiment, is obtained, and this time T12 is regarded as a start position of an initial sampling pulse S108a. In this second embodiment, especially, the first interval is ½ of the sampling pulse interval value 112b.

Then, from the start position of the initial sampling pulse S108a, generation of the following pulses is started: an initial sampling pulse S108a shown in FIG. 7(e), and a sampling data selection pulse S108b indicating which data is to be sampled, between the data of the binary original signal S107a and the data of the binary interpolation signal S107b.

It is assumed that phase error such as group delay occurs at time T13. The phase error detection circuit 110 detects every change point at which the binary original signal S107a and the binary interpolation signal S107b change from 0 to 1, and checks whether there is a phase difference or not between a point shifted by the first interval from each detected change point and the initial sampling pulse S108a started from time T12. When there is no phase error between the point and the pulse, no phase difference occurs. However, when a phase error occurs at time T13 as shown in FIG. 7(a), a phase difference occurs between them. In this case, at time T13, the sampling pulse correction circuit 109 performs correction on the initial sampling pulse S108a and the sampling data selection pulse S108b which are started to generate from time T12 and, finally, a corrected sampling pulse S109a and a corrected sampling data selection pulse S109b are generated as shown in FIGS. 7(f) and 7(g), respectively.

In the sampling circuit 111, text data are sampled from the binary original signal S107a or the binary interpolation signal S107b, on the basis of the corrected sampling pulse S109a and the corrected sampling data selection pulse S109b. The sampled data S111 are shown in FIG. 7(h).

Figure 8:
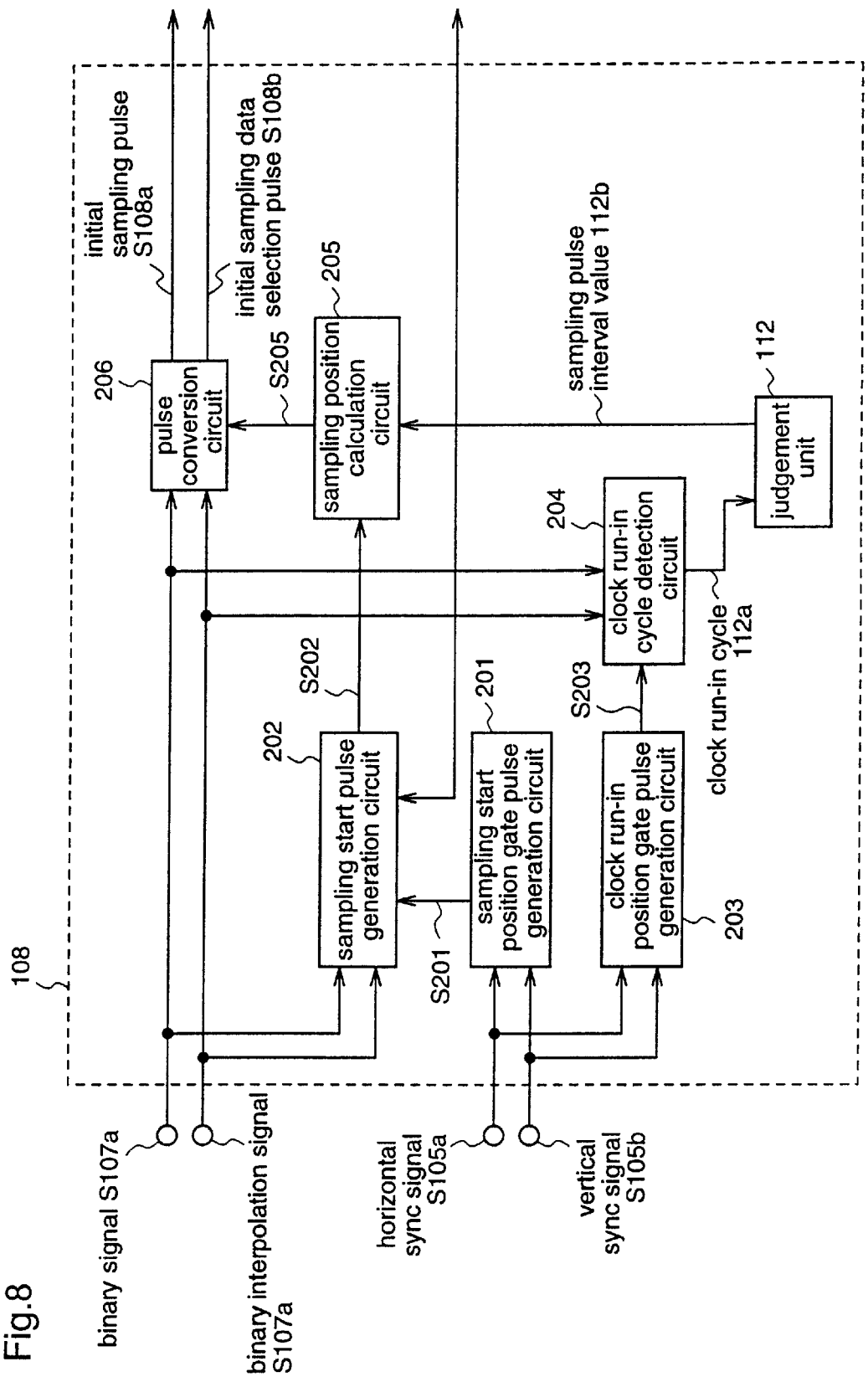
FIG. 8 is a block diagram illustrating the construction of an initial sampling pulse generation circuit included in the broadcast text data sampling apparatus of the second embodiment.

FIG. 8 is a block diagram illustrating the internal construction of the initial sampling pulse generation circuit 108. In FIG. 8, the same reference numerals as those shown in FIG. 6 designate the same or corresponding parts. A sampling start position gate pulse generation circuit 201 is means to set a sampling start period for setting a sampling start position. This circuit 201 receives the horizontal sync signal S105a and the vertical sync signal S105b, detects the position between the clock run-in period and the framing code period, and generates a sampling start position gate pulse S201 of a predetermined period between the clock run-in period and the framing code period. A clock run-in position gate pulse generation circuit 203 is means to set a clock run-in position. This circuit 203 receives the horizontal sync signal S105a and the vertical sync signal S105b, and generates a clock run-in position gate pulse S203 of the same length as the clock run-in period, for indicating the clock run-in period, using the sync signals S105a and S105b.

A clock run-in period detection circuit 204 detects change points at which the binary original signal S107a and the binary interpolation signal S107b change from 0 to 1, within the clock run-in gate pulse period, and sends the number of sampling clocks between the change points as a clock run-in cycle 112a to a controller 112. Although the number of sampling clocks used by the A/D converter 102 is adopted as the above-mentioned number of sampling clocks, in this second embodiment the digital signal S102 obtained by sampling by the A/D converter 102 is further interpolated by the data interpolation circuit 104. That is, the analog video signal S101 is over-sampled. Therefore, the number of sampling clocks to be used as a unit of the clock run-in cycle 112a may be the number of clocks, each clock having a cycle equal to the interpolation cycle by the data interpolation circuit 104, that is, the number of clocks of over sampling. Hereinafter, the clock with regard to the interpolation cycle is referred to as "over-sampling clock".

A judgement unit 112 holds the sampling frequency by the A/D converter 102, the interpolation cycle by the data interpolation circuit 104, i.e., the frequency of the over-sampling clock, and the transmission clock frequencies corresponding to the respective types of text broadcastings. Using these frequencies, the judgement unit 112 judges the type of text broadcasting by specifying a text broadcasting having a transmission clock cycle closest to the clock run-in cycle 112a obtained by the clock run-in cycle detection circuit 204, and obtains a transmission clock cycle according to the judged text broadcasting. Then, the judgement unit 112 calculates a sampling pulse interval value 112b that matches the transmission clock cycle, using the number of over-sampling clocks as a unit, and outputs the sampling pulse interval value 112b to a sampling position calculation circuit 205, a sampling start pulse generation circuit 202, and an external phase error detection circuit 110. When detection of the clock run-in cycle by the clock run-in cycle detection circuit 204 is carried out using the number of over-sampling clocks as a unit, if this detection is carried out at high precision, the judgement unit 112 may be dispensed with, because the clock run-in cycle is equal to the transmission clock cycle (i.e., the sampling interval value), and further, the unit is also the over-sampling clock unit. However, since there is a possibility that detection of the clock run-in cycle by the clock run-in cycle detection circuit 24 has errors, it is desirable that the judgement unit 112 judges the type of text broadcasting having a transmission clock cycle closest to the clock run-in cycle to output a precise sampling interval value 112b. To be employed as the judgement unit 112 is a processor, or a register that outputs a sampling pulse interval value calculated in advance according to the inputted clock run-in cycle, or the like.

A sampling start pulse generation circuit 202 generates a sampling start pulse S202 indicating the sampling start position, on the basis of the sampling pulse interval value 112b according to the type of text broadcasting supplied from the judgement unit 112, within the period of the sampling start position gate pulse S201. To be specific, a change point at which the binary original signal S107a and the binary interpolation signal S107b change from 0 to 1 is detected within the period of the sampling start position gate pulse S201, and the sampling start pulse S202 is generated in a position shifted backward from this change point by the above-mentioned first interval.

A sampling position calculation circuit 205 sequentially calculates sampling positions S205, with the sampling pulse interval value 112b, starting from the position of the sampling start pulse S202. The unit of each sampling position S205 is the number of over-sampling clocks.

A pulse conversion circuit 206 optimizes each sampling position S205. That is, when the value of the sampling position S205 is a decimal, the pulse conversion circuit 206 converts the decimal to an integer. This optimization is needed because the binary original signal S107a and the binary interpolation signal S107b have been over-sampled in the over-sampling clock unit. Then, the pulse conversion circuit 206 generates an initial sampling pulse S108a indicating the positions of data to be sampled from the binary original signal S107a and the binary interpolation signal S107b, and a sampling data selection pulse S108b indicating which data is to be sampled according to the initial sampling pulse S108a between the data of the binary original signal S107a and the data of the binary interpolation signal S107b, on the basis of the optimized sampling position, the binary original signal S107a, and the binary interpolation signal S107b, and then outputs the pulses S108a and S108b to the sampling pulse correction circuit 109.

FIGS. 9(a)–9(g) are timing charts for explaining the operation of the initial sampling pulse generation circuit 108. In the figures, the same reference numerals as those shown in FIGS. 7(a)–7(h) denote the same or corresponding parts. Hereinafter, the operation of the respective blocks of the initial sampling pulse generation circuit 108 will be described with reference to FIGS. 8 and 9(a)–9(g).

Figure 9:
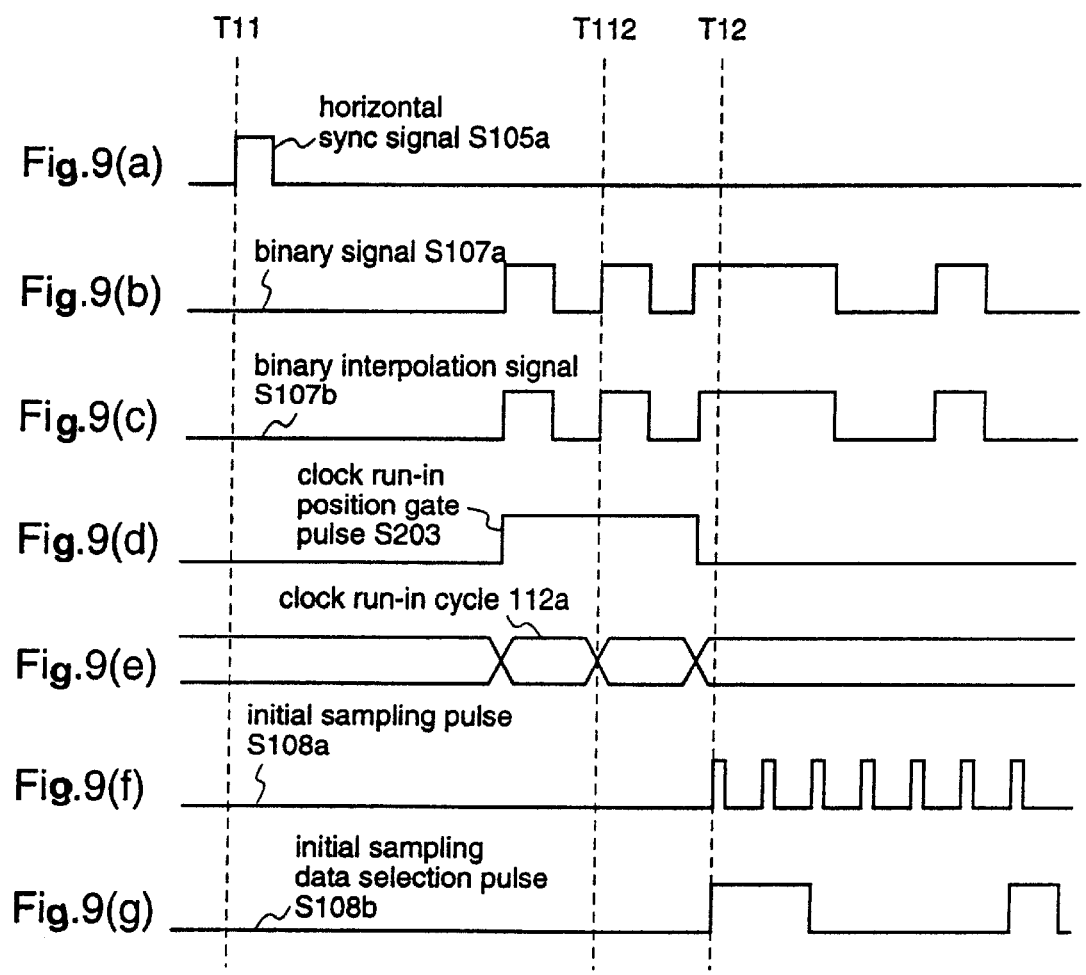
FIGS. 9(a)–9(g) are timing charts for explaining the operation of the initial sampling pulse generation circuit according to the second embodiment.

As shown in FIG. 9(a), at time T11, the horizontal sync signal S105a is separated by the synchronous separation circuit 105. At time T112, a change point, at which the binary original signal S107a shown in FIG. 9(b) and the binary interpolation signal S107b shown in FIG. 9(d) change from 0 to 1, is detected within the period during which the clock run-in position gate pulse S203 shown in FIG. 9(d) is being outputted. The clock run-in cycle detection circuit 204 detects the number of sampling clocks between the change points within the clock run-in period, as a clock run-in cycle 112a shown in FIG. 9(e).

The judgement unit 112 judges the type of text broadcasting on the basis of the clock run-in cycle 112a, and calculates a sampling pulse interval value 112b according to the type of text broadcasting.

At time T12 within the sampling start position gate pulse S201 that is set in the vicinity of the position between the clock run-in period and the framing code period by the sampling start position gate pulse generation circuit 201, the sampling start pulse generation circuit 202 generates a sampling start pulse S202 on the basis of the sampling pulse interval value 112b, the binary original signal S107a, and the binary interpolation signal S107b. This sampling start pulse S202 is generated at a position that is shifted by the above-mentioned first interval, i.e., ½ of the sampling pulse interval value 112b, from the 0-to-1 change point of the binary original signal S107a and the binary interpolation signal S107b.

The sampling position calculation circuit 205 calculates sampling positions on the basis of the sampling pulse interval value 112b, starting from the sampling start pulse S202 generated at time T12, and the pulse conversion circuit 206 generates an initial sampling pulse S108a shown in FIG. 9(f) and an initial sampling data selection pulse S108b shown in FIG. 9(g).

Figure 10:
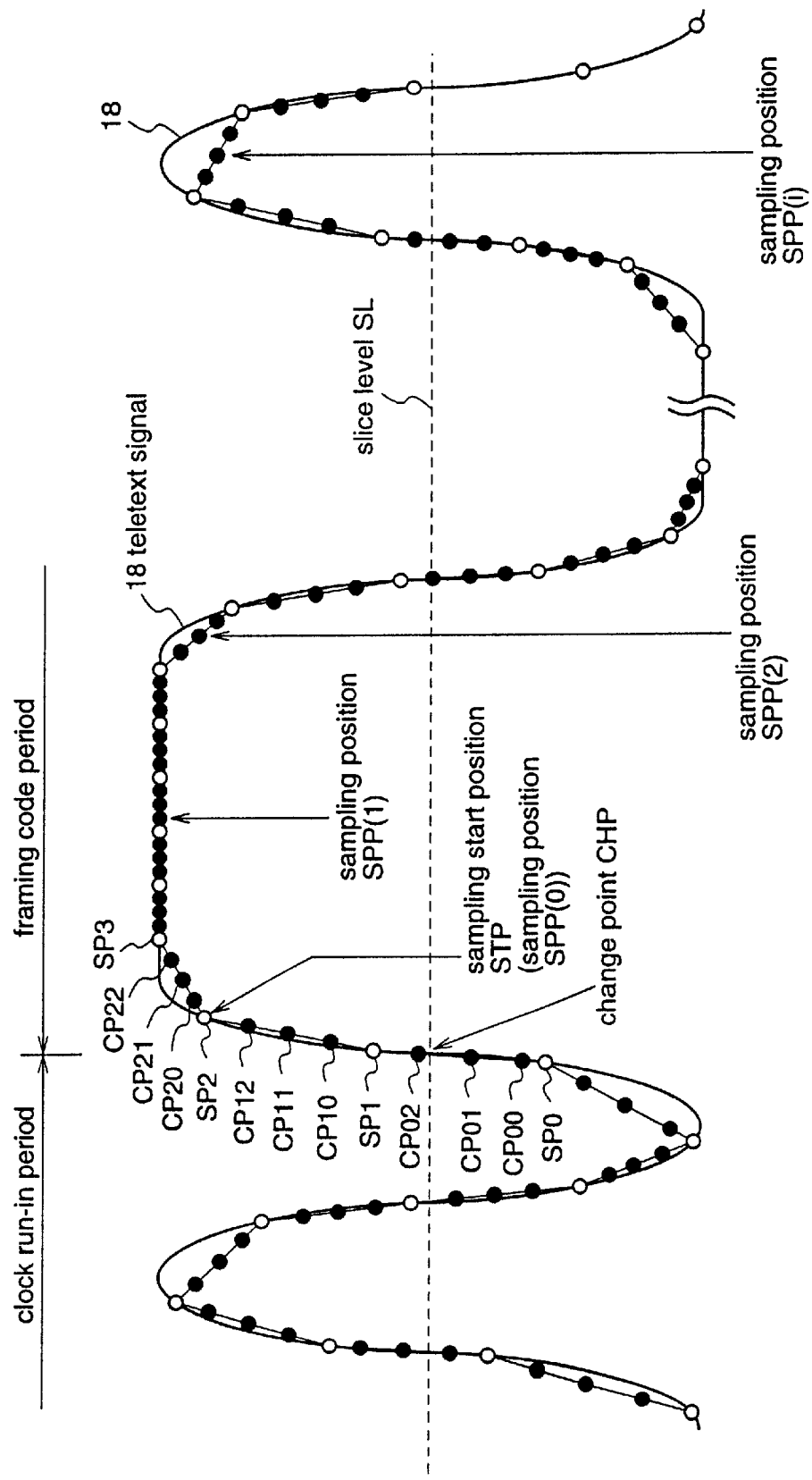
FIG. 10 is a schematic diagram for explaining the operation of the initial sampling pulse generation circuit according to the second embodiment.

FIG. 10 is a schematic diagram illustrating the relationship between a broadcast text signal and sampled text data, for specifically explaining the operation of the initial sampling pulse generation circuit 108. Initially, a description will be given of the case where the broadcast text signal is a teletext signal. In FIG. 10, SPt (t: integer not less than 0) shown by white dots are original signal data (also referred to as original data) which are obtained by converting a teletext signal 18 having a transmission clock of 6.9375 MHz into a digital signal using a sampling clock fs(MHz) of 24 MHz. Other white dots also indicate original signal data. Black dots indicate interpolation signal data (also referred to as interpolation data) obtained by performing n-times interpolation (n: integer) using linear interpolation between the original signal data SPt and SPT+1. In FIG. 10, interpolation signal data generated by 4-times interpolation are CPt0, CPt1, and CPt2. To use 4-times interpolation is equivalent to perform sampling with an over-sampling clock of 96 MHz that is 24 MHz×4.

Hereinafter, the operation of the initial sampling pulse generation circuit 108 will be described in detail with reference to FIG. 10. Initially, a change point CHP at which the binary signals S107a and S107b change from 0 to 1 is detected within the sampling start position gate pulse period in the vicinity of the position between the clock run-in period and the framing code period. Based on the change point CHP, the clock run-in cycle detection circuit 24 obtains a clock run-in cycle 112a in sampling clock units. Then, the judgement unit 112 obtains a sampling pulse interval value 112b from the clock run-in cycle 112a, with the number of over-sampling clocks as a unit. Assuming that the type of the text broadcasting is precisely detected, i.e., the transmission clock is precisely detected, the sampling pulse interval value 112b becomes 13.8378, with the number of over-sampling clocks (96 MHz) as a unit.

Then, the sampling start pulse generation circuit 202 sets a sampling start position STP at a position that is about ½ of the sampling pulse interval value 112b (i.e., the first interval) shifted backward from the change point CHP. The ½ of the sampling pulse interval value 112b is 6.9189 based on the number of sampling clocks as a unit. Since sampling points should be integers, the sampling start position STP becomes 6 by discarding the fractional portion of 6.9189 from the change point CHP. Although the fractional portion is discarded (rounded down), it may be rounded off to the nearest integer or rounded up, with the same effect as mentioned above. In FIG. 10, the change point CHP corresponds to interpolation data CP01, and the position of original data SP2 that is placed by six points to the right from the change point CHP corresponds to the sampling start position STP. That is, phase matching of the teletext signal to the transmission clock is performed by calculating the sampling start position STP.

Thereafter, the sampling position calculation circuit 25 sequentially calculates the positions of data in the binary signal, which data are positioned at intervals closest to the sampling pulse interval value 112b, starting from the sampling start position STP. That is, as shown in FIG. 10, the sampling position SPP(0) corresponds to the sampling start position STP, and sampling data SPP(i) are sequentially calculated. Each SPP(i) indicates the i-th (i: integer not less than 0) sampling data. In this second embodiment, sampling positions SPP(i) are calculated at the sampling intervals of 13.8378. However, since the sampling interval is a decimal, the sampling position SPP(i) is also expressed by a decimal. Accordingly, as data to be sampled, either data of the binary original signal or data of the binary interpolation signal, whichever is closest to the calculated sampling position SPP(i), is selected. The data to be selected is present in a position obtained by discarding the fractional portion of the sampling pulse position SPP(i). Since discarding the fractional portion of 13.8378 results in 13, the 13th data, the 26th data, . . . from the sampling start position STP are sequentially designated as sampling positions SPP(1), SPP(2), . . . , as shown in FIG. 10. Although the fractional portion of 13.8378 is discarded (rounded down), it may be rounded off to the nearest integer or rounded up, with the same effect as mentioned above. In this way, the initial sampling pulse generation circuit 108 generates the sampling pulse S108a for designating the positions of sampling data which are closest to the respective sampling positions SPP(i) and are separated from each other at intervals of the sampling pulse interval value 112b, thereby performing precise data sampling according to the teletext signal.

Even when the broadcast text signal is not a teletext signal, it is possible to realize precise data sampling by judging the type of text broadcasting, calculating a sampling pulse interval value 112b according to the type, and generating an initial sampling pulse S108a on the basis of the sampling pulse interval value 112b.

As described above, according to the second embodiment of the present invention, the type of text broadcasting is judged by obtaining a clock run-in cycle 112a from the clock run-in period, and a sampling pulse interval value 112b according to the type of text broadcasting is generated, and then an initial sampling pulse S108a for sampling data from the binary original signal S107a and the binary interpolation signal S107b, which data are positioned at intervals closest to the sampling pulse interval value 112b, is generated. As the result, it is possible to sequentially sample data that are positioned at intervals closest to the sampling interval according to the type of text broadcasting, thereby realizing precise sampling of text data corresponding to plural types of text broadcastings having different clock frequencies.

Figure 11:
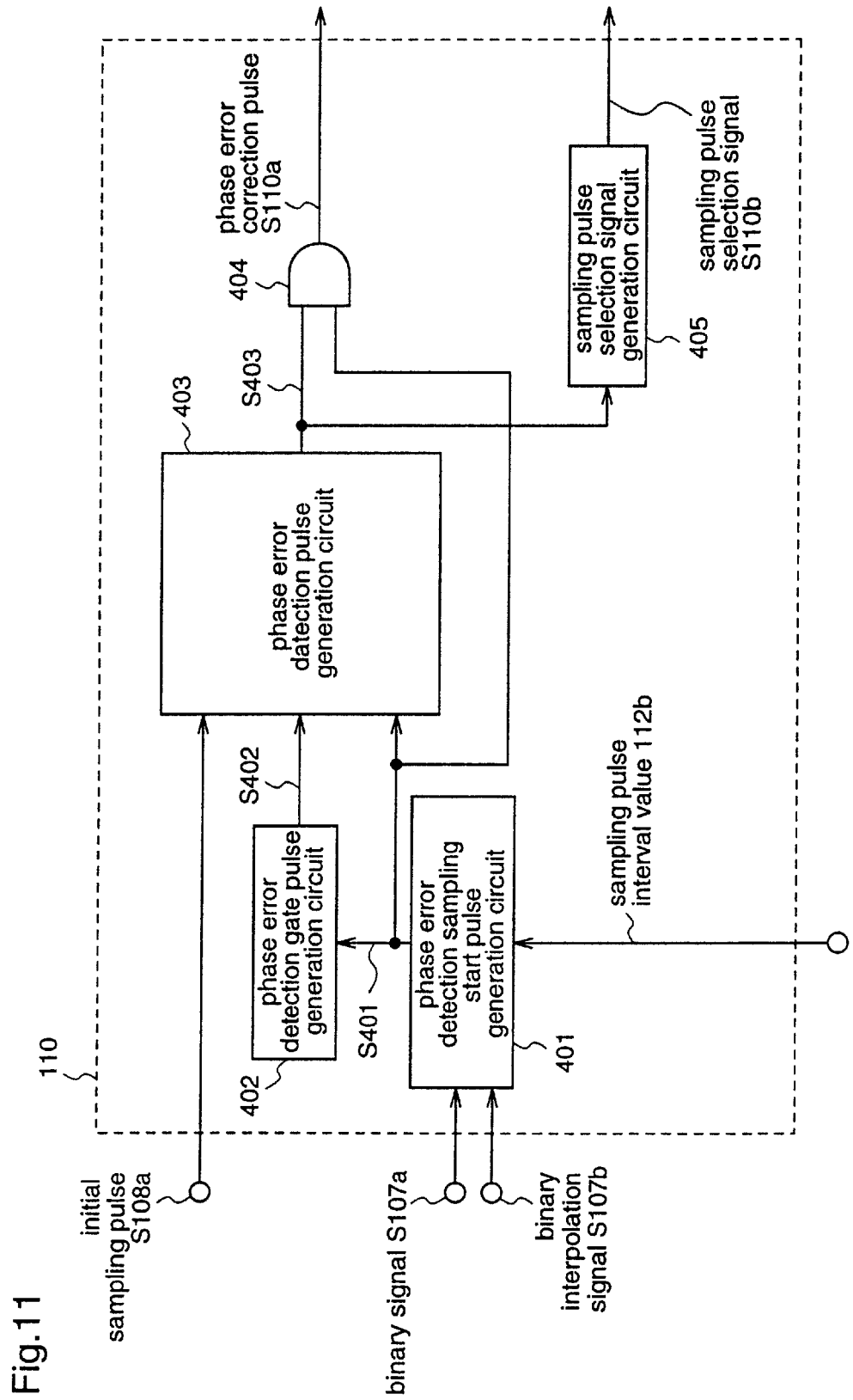
FIG. 11 is a block diagram illustrating the construction of a phase error detection circuit included in the broadcast text data sampling apparatus of the second embodiment.

FIG. 11 is a block diagram illustrating the internal construction of the phase error detection circuit 110. In FIG. 11, the same reference numerals as those shown in FIG. 6 denote the same or corresponding parts. A phase error detection sampling start pulse generation circuit 401 continuously detects 0-to-1 change points of the binary original signal S107a and the binary interpolation signal S107b which are generated in the binary circuit 107, and generates a phase error detection sampling start pulse S401 for phase error detection, in a position shifted from each detected change point by the above-mentioned first interval, i.e., ½ of the sampling pulse interval value.

A phase error detection gate pulse generation circuit 402 generates a phase error detection gate pulse S402 having a sampling clock width of ±N with respect to the position of the phase error detection sampling start pulse S401, corresponding to each phase error detection sampling start pulse S401.

A phase error detection pulse generation circuit 403 is means to set a phase error detection period for phase error detection. To be specific, the phase error detection pulse generation circuit 403 detects a phase error between the initial sampling pulse S108a generated by the initial sampling pulse generation circuit 108 and each phase error detection sampling start pulse S401, utilizing the phase error detection gate pulse S402 corresponding to each phase error detection sampling start pulse S401, and generates, as a phase error detection pulse S403, a phase error detection gate pulse S402 at a position where the phase error occurs. Whether a phase error occurs or not depends on whether the initial sampling pulse S108a is included in the range of the sampling clock width of ±N with respect to the position of the phase error detection sampling start pulse S401. That is, when the initial sampling pulse S108a is included in this range, it is judged that no phase error occurs. Otherwise, it is judged that a phase error occurs. Accordingly, the value of N is determined according to the detection precision, and phase error detection of the highest precision is achieved when the value of N is set at 0.

An AND circuit 404 generates, as a phase error correction pulse S110a, a phase error detection sampling start pulse S401 that exists within the period of the phase error detection pulse S403. When the phase error detection pulse S403 is generated, a sampling pulse selection signal generation circuit 405 generates a sampling pulse selection signal S110b instructing that the sampling pulse corrected on the basis of the phase error correction pulse S110a is to be selected.

FIGS. 12(a)–12(e) are timing charts for explaining the operation of the phase error detection circuit 110. In FIGS. 12(a)–12(e), the same reference numerals as those shown in FIG. 7 designate the same or corresponding parts. FIGS. 12(a)–12(e) show the case where, after an initial sampling pulse S108 is generated at time T12, a phase error occurs in the binary original signal S107a and the binary interpolation signal S107b at time T13. Hereinafter, the operation of the phase error detection circuit 110 will be described with reference to FIGS. 11 and 12(a)–12(e).

Figure 12:
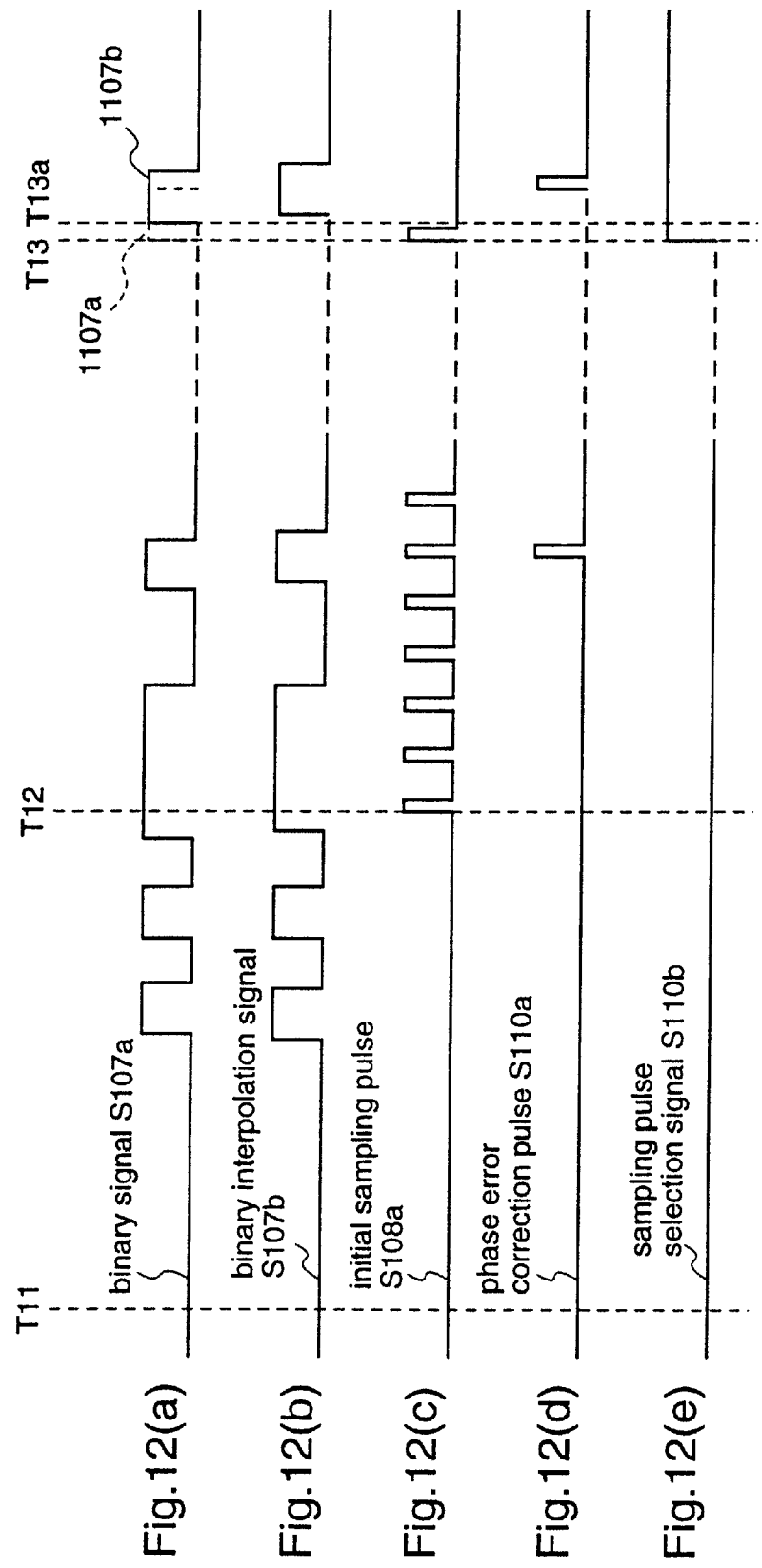
FIGS. 12(a)–12(e) are timing charts for explaining the operation of the phase error detection circuit according to the second embodiment.

Sampling of data from the binary original signal S107a and the binary interpolation signal S107b shown in FIGS. 12(a) and 12(b) is carried out using the initial sampling pulse S108a shown in FIG. 12(c) that is generated starting from time T12. At time T13, a phase error occurs in the binary original signal S107a and the binary interpolation signal S107b, and this phase error interferes with normal sampling. For example, it is assumed that data which should be present at a position 1107a where the rising edge exists at time T13, is shifted, due to a phase error, to a position 1107b where the rising edge exists at time T13a that is slightly behind time T13. In this case, when this data is sampled with the initial sampling pulse S108a, the sampled data value becomes 0 although it is ought to be 1 if no phase error occurs.

At time T13 when such phase error occurs, a phase difference larger than a predetermined value is generated between the initial sampling pulse S108a and the phase error detection sampling start pulse S401 that is generated at the position shifted by the first interval, i.e., ½ of the sampling pulse interval value 112b, from the 0-to-1 change point of the binary original signal S107a and the binary interpolation signal S107b. Accordingly, the phase error detection pulse generation circuit 403 detects time T13 when the phase difference is generated as a time when a phase error occurs, and outputs a phase error detection sampling start pulse S401 corresponding to this phase error occurrence time as a phase error correction pulse S110a shown in FIG. 12(d). After time T13, the sampling pulse selection signal generation circuit 405 generates a sampling pulse selection signal S110b shown in FIG. 12(e) so that a pulse corrected by the sampling pulse correction circuit 109 on the basis of the phase error correction pulse S110a is selected as a sampling pulse.

Figure 13:
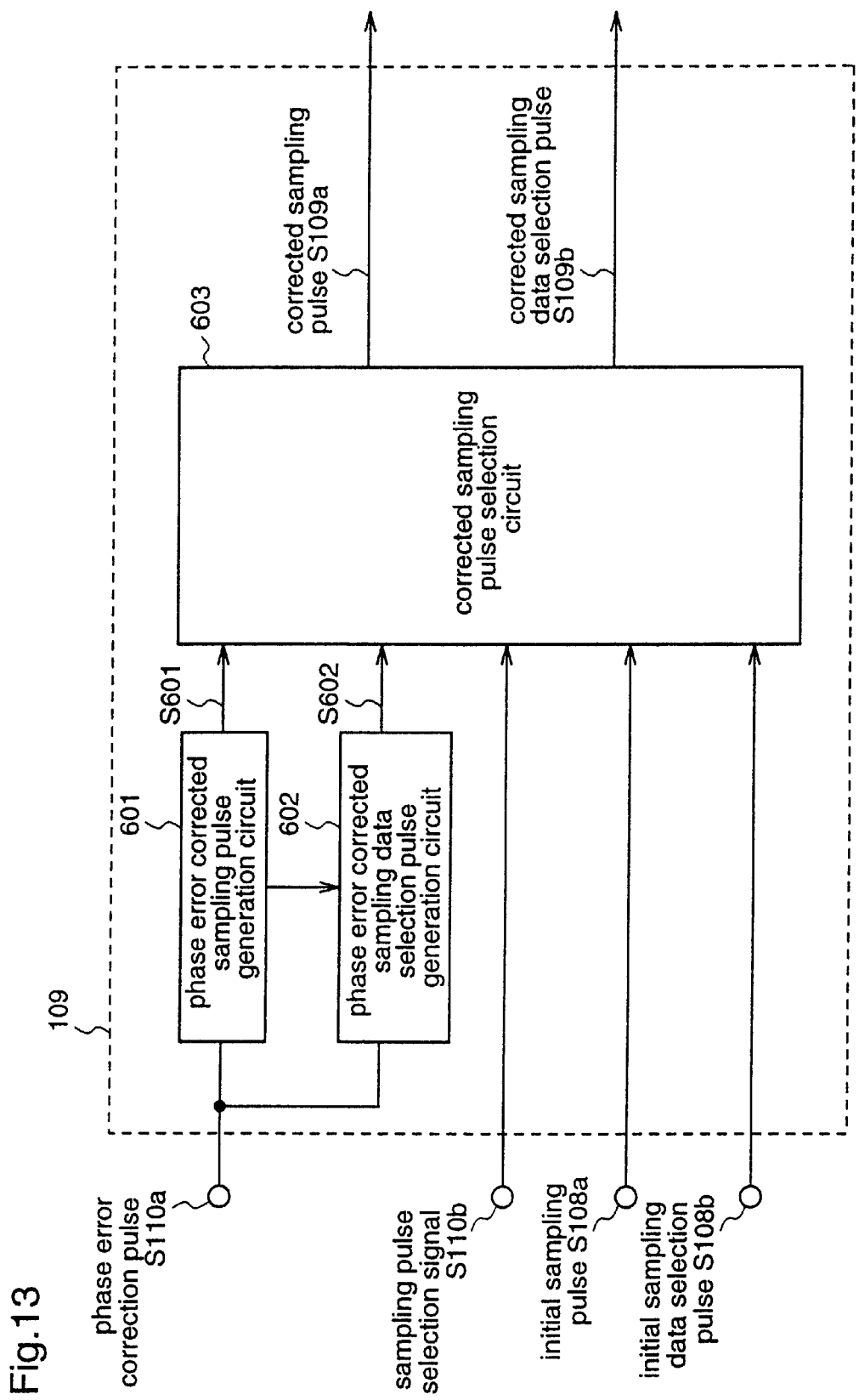
FIG. 13 is a block diagram illustrating the construction of a sampling pulse correction circuit included in the broadcast text data sampling apparatus of the second embodiment.

FIG. 13 is a block diagram illustrating the internal construction of the sampling pulse correction circuit 109. In FIG. 13, the same reference numerals as those shown in FIG. 6 designate the same or corresponding parts. A phase error corrected sampling pulse generation circuit 601 is provided with circuits (not shown) corresponding to the sampling position calculation circuit 205 and the pulse conversion circuit 206 which are included in the initial sampling pulse generation circuit 108 shown in FIG. 8. Like the initial sampling pulse generation circuit 108, the phase error corrected sampling pulse generation circuit 601 calculates sampling positions of data from the binary original signal S107a and the binary interpolation signal S107b, starting from the phase error correction pulse S110a generated in the phase error detection circuit 110, on the basis of the sampling pulse interval value 112b supplied from the initial sampling pulse generation circuit 108, and generates a phase error corrected sampling pulse S601 on the basis of the sampling positions.

A phase error corrected sampling data selection pulse generation circuit 602 generates a phase error corrected sampling data selection pulse S602 for selecting either data of the binary original signal S107a or data of the binary interpolation signal S107b according to the phase error corrected sampling pulse S601, starting from the phase error correction pulse S110a, on the basis of the sampling positions calculated by the phase error corrected sampling pulse generation circuit 601.

A corrected sampling pulse selection circuit 603 selects either the initial sampling pulse S108a generated by the initial sampling pulse generation circuit 108 or the phase error corrected sampling pulse S601, and selects either the initial sampling data selection pulse S108b generated by the initial sampling pulse generation circuit 108 or the phase error correction sampling data selection pulse S602, and outputs the selected pulses as a corrected sampling pulse S109a and a corrected sampling data selection pulse S109b, respectively. While the sampling pulse selection signal S110b is 0, the initial sampling pulse S108a is selected as the corrected sampling pulse S109a. While the sampling pulse selection signal S110b is 1, the phase error corrected sampling data selection pulse S602 is selected.

FIGS. 14(a)–14(f) are timing charts for explaining the operation of the sampling pulse correction circuit 109. In FIGS. 14(a)–14(f), the same reference numerals as those shown in FIG. 13 designate the same or corresponding parts. In the FIGS. 14(a)–14(f), it is assumed that a signal phase error occurs at time T13. Hereinafter, the operation of the sampling pulse correction circuit 109 will be described with reference to FIGS. 14(a)–14(f).

Figure 14:
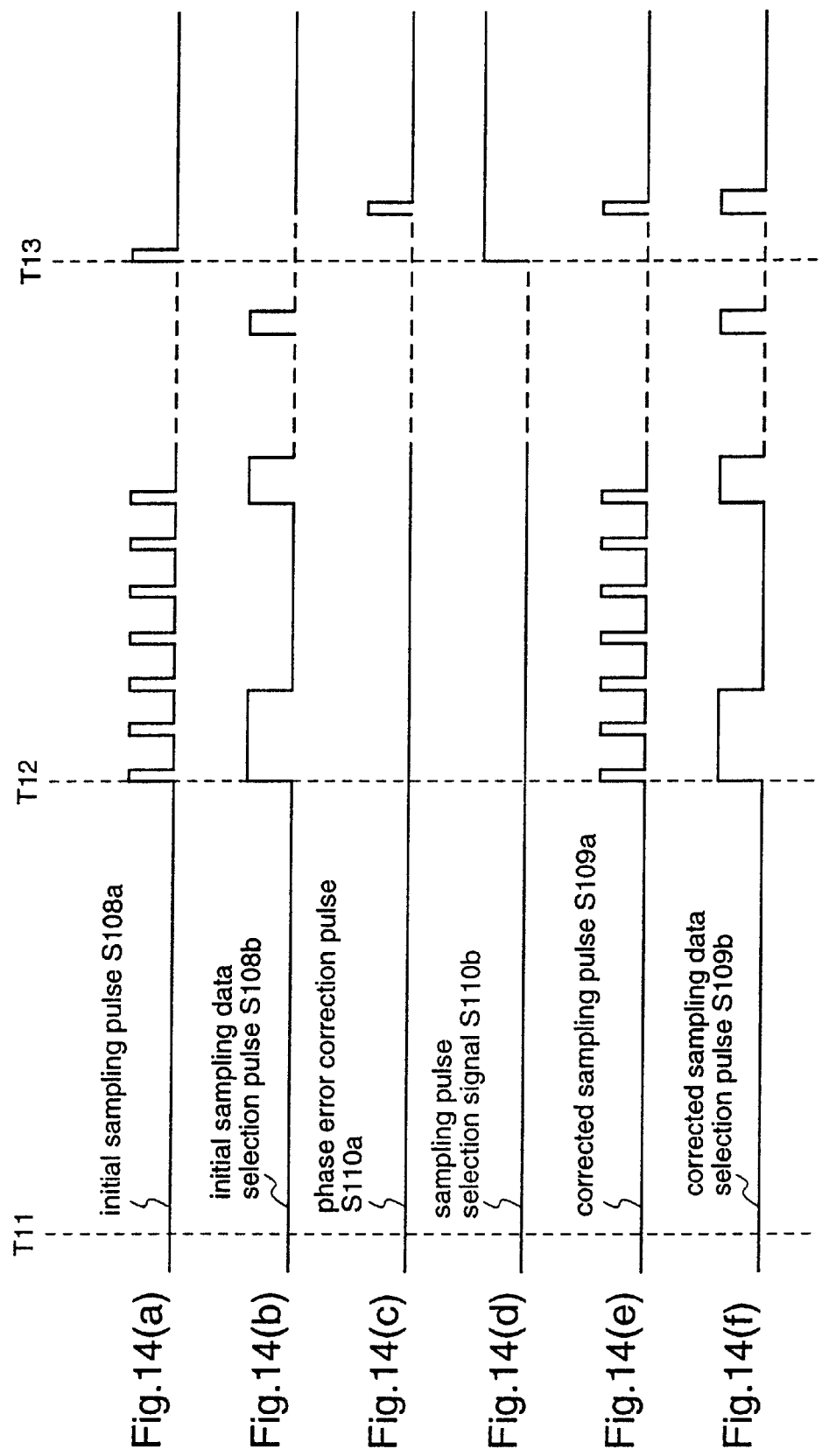
FIGS. 14(a)–14(f) are timing charts for explaining the operation of the sampling pulse correction circuit according to the second embodiment.

At time T12, the initial sampling pulse generation circuit 108 starts to generate an initial sampling pulse S108a and an initial sampling data selection pulse S108b as shown in FIGS. 14(a) and 14(b), respectively, and the sampling pulse correction circuit 109 outputs these signals as they are, as a corrected sampling pulse S109a and a corrected sampling data selection pulse S109b, respectively. When a phase error is detected at time T13, a sampling pulse selection signal S110b shown in FIG. 14(d) becomes 1, and the corrected sampling pulse selection circuit 603 selects a phase error corrected sampling pulse S601 generated by the phase error corrected sampling pulse generation circuit 601 and a phase error corrected sampling data selection pulse S602 generated by the phase error corrected sampling data selection pulse generation circuit 602, on the basis of a phase-error correction pulse S110a shown in FIG. 14(c). As the result, as a corrected sampling pulse S109a, the initial sampling pulse S108a is outputted during the period from time T12 to time T13, and the phase error corrected sampling pulse S601 generated on the basis of the phase error correction pulse S110a is outputted after time T13. Likewise, as a corrected sampling data selection pulse S109b, the initial sampling data selection pulse S108b is outputted during the period from time T12 to time T13, and the phase error corrected sampling data selection pulse S602 generated on the basis of the phase error correction pulse S110a is outputted after time T13.

In this way, when there is a phase error in the broadcast text signal, this phase error is detected, and a phase error corrected sampling pulse S601 corresponding to the phase error is generated as a corrected sampling pulse S109. When there is no phase error, since no phase error is detected, an initial sampling pulse S108a is generated as a corrected sampling pulse S109. Therefore, sampling of data from a text signal can be performed precisely, regardless of whether or not a phase error occurs in the text signal in the middle of the line due to group delay or the like.

As described above, according to the second embodiment of the present invention, the digital data obtained by A/D conversion is further interpolated by the data interpolation circuit 104, and data are sampled from the data comprising the original data and the interpolation data. Therefore, highly precise sampling of text data is achieved, in addition to the same effects as those described for the first embodiment.

Further, according to the second embodiment of the present invention, phase error detection is carried out on the basis of the initial sampling pulse S108a, and when a phase error is detected, a phase error correction pulse S110a is outputted. When the phase error correction pulse S110a is not outputted, sampling of text data is carried out using the initial sampling pulse S108a as a corrected sampling pulse S109a. When the phase error correction pulse S110a is outputted, a phase error corrected sampling pulse S601, which starts from the position where the phase error correction pulse S110a is outputted, is generated on the basis of the sampling pulse interval value 112b, and sampling of text data is carried out using this pulse S601 as a corrected sampling pulse S109a. Therefore, even when a phase error occurs in the broadcast text signal due to group delay or the like, sampling of text data can be precisely performed by using the sampling pulse that is corrected according to the phase error, resulting in reduced sampling error.

Further, since the phase error detection circuit 110 performs detection of phase error and the sampling pulse correction circuit 109 corrects the sampling pulse, a higher-order filter for waveform equalization or the like is not required as a filter used for the A/D-converted digital signal, and only a simple filter for noise removal such as a low-pass filter 103 is required, resulting in reduced circuit scale.

[Embodiment 3]

Figure 15:
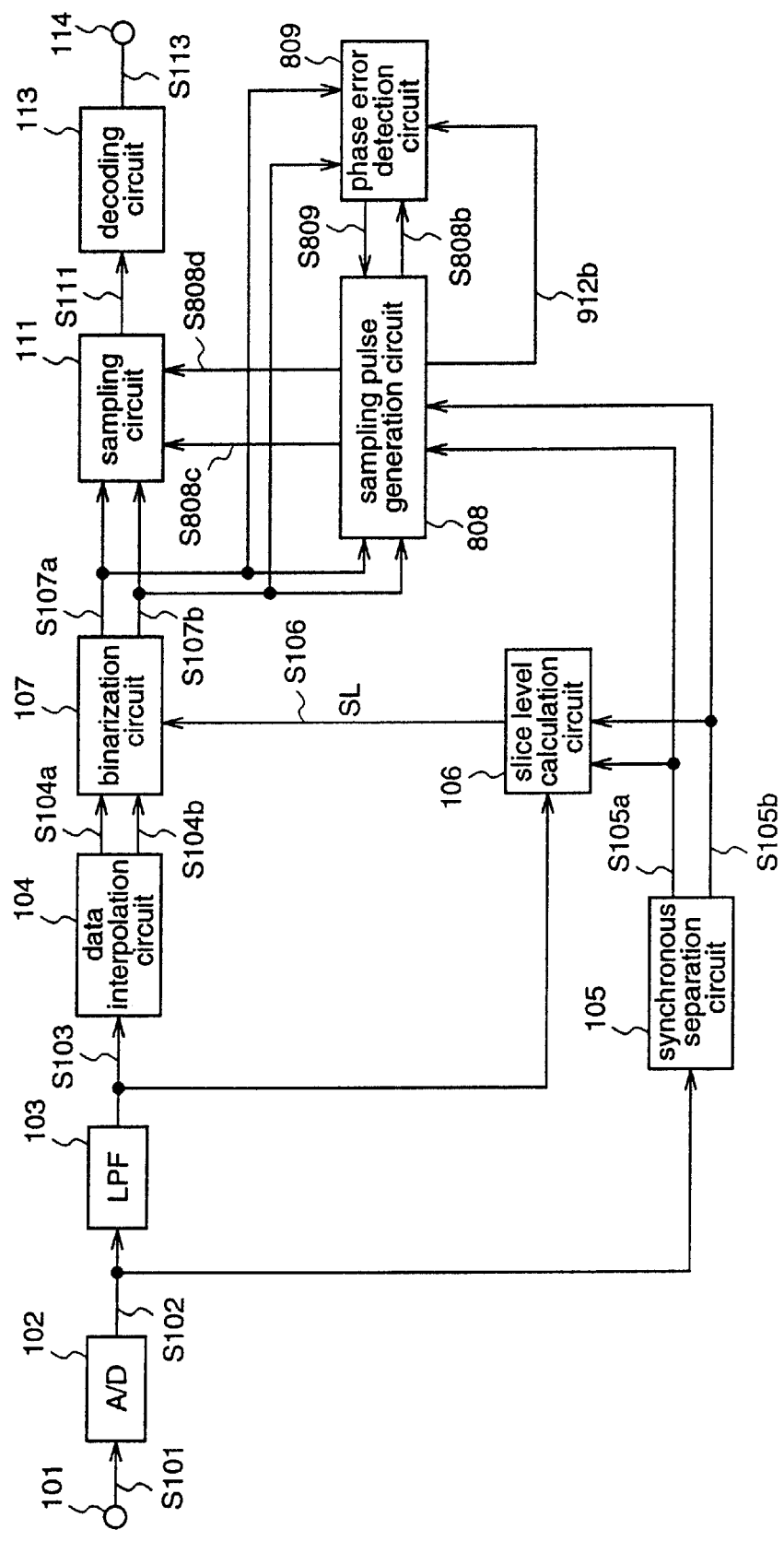
FIG. 15 is a block diagram illustrating the construction of a broadcast text data sampling apparatus according to a third embodiment of the present invention.

FIG. 15 is a block diagram illustrating the construction of a broadcast text data sampling apparatus according to a third embodiment of the present invention. In FIG. 15, the same reference numerals as those shown in FIG. 6 designate the same or corresponding parts. A sampling pulse generation circuit 808 receives a binary original signal S107a and a binary interpolation signal S107b, and calculates a clock run-in cycle, using the number of sampling clocks as a unit. Then, the sampling pulse generation circuit 808 judges the type of text broadcasting on the basis of the calculated clock run-in cycle, and calculates a sampling pulse interval value 912b that is required for sampling pulse generation, with the number of sampling clocks as a unit, on the basis of the cycle of the transmission clock corresponding to the judged type of text broadcasting. Further, the sampling pulse generation circuit 808 determines a text data sampling start position, using a horizontal sync signal S105a and a vertical sync signal S105b. Then, the sampling pulse generation circuit 808 sequentially calculates, starting from the sampling start position, the positions of data in the binary original signal S107a and the binary interpolation signal S107b, which data are positioned at intervals closest to the sampling interval value 912b, and generates an initial sampling pulse S808b designating these data positions as data sampling positions.

A phase error detection circuit 809 receives the binary original signal S107a, the binary interpolation signal S107b, the initial sampling pulse S808b generated in the sampling pulse generation circuit 808, and the sampling pulse interval value 912b. Based on these inputs, the phase error detection circuit 809 detects a phase error in the text signal, and generates a phase error correction pulse S809 in the position where the phase error is detected, and outputs it to the sampling pulse generation circuit 808.

The sampling pulse generation circuit 808 corrects the initial sampling pulse S808b according to the phase error correction pulse S809, thereby generating a sampling pulse S808c corresponding to the phase error, and a sampling pulse selection signal S808d designating which data is to be sampled according to the sampling pulse S808c between the data of the binary original signal S107a and the data of the binary interpolation signal S107b, and outputs them to a sampling circuit 111.

The sampling circuit 111 samples text data from the binary original signal S107a and the binary interpolation signal S107b on the basis of the sampling pulse S808c and the sampling pulse selection signal S808d, as in the second embodiment.

Since the operations of the constituents of the broadcast text data sampling apparatus, except the sampling pulse generation circuit 808 and the phase error detection circuit 809, are identical to those already described for the second embodiment, repeated description is not necessary.

Figure 16:
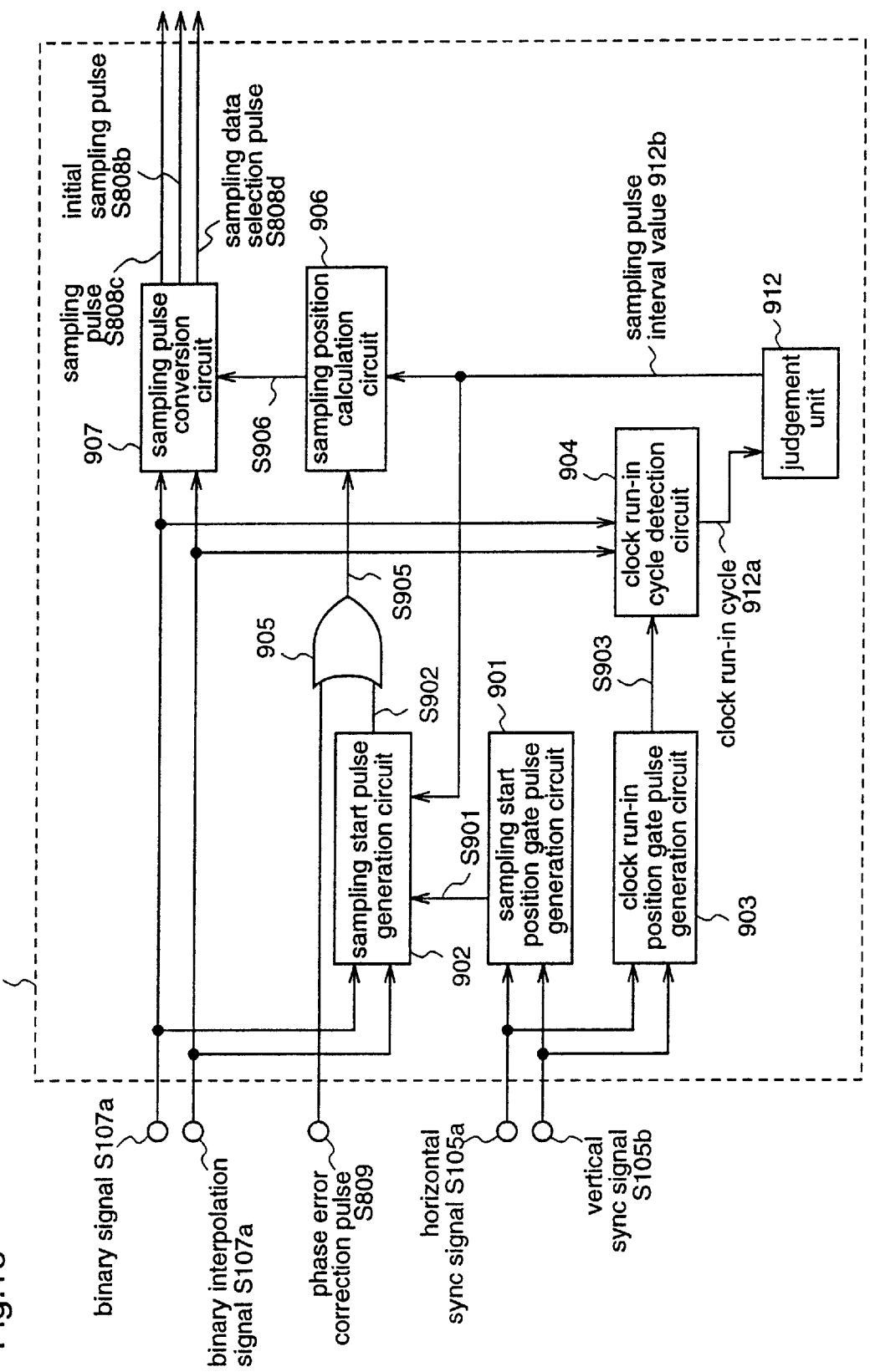
FIG. 16 is a block diagram illustrating the construction of a sampling pulse generation circuit included in the broadcast text data sampling apparatus of the third embodiment.

FIG. 16 is a block diagram illustrating the internal construction of the sampling pulse generation circuit 808. In FIG. 16, the same reference numerals as those shown in FIG. 15 designate the same or corresponding parts. A sampling start position gate pulse generation circuit 901 is means to set a sampling start period for setting a sampling start position. This circuit 901 receives the horizontal sync signal S105a and the vertical sync signal. S105b, detects the position between the clock run-in period and the framing code period, and generates a sampling start position gate pulse S901 of a predetermined period between the clock run-in period and the framing code period. A clock run-in position gate pulse generation circuit 903 is means to set a clock run-in position. This circuit 903 receives the horizontal sync signal S105a and the vertical sync signal S105b, and generates a clock run-in position gate pulse S903 of the same length as the clock run-in period, for indicating the clock run-in period, using the sync signals S105a and S105b.

A clock run-in period detection circuit 904 detects change points at which the binary original signal S107a and the binary interpolation signal S107b change from 0 to 1, within the clock run-in gate pulse period, and sends the number of sampling clocks between the change points, as a clock run-in cycle 912a, to a judgement unit 912. Although in this third embodiment the number of sampling clocks used by the A/D converter 102 is adopted as the above-mentioned number of sampling clocks, the over-sampling clock with regard to the interpolation cycle by the data interpolation circuit 104 may be adopted.

The judgement unit 912 holds the sampling frequency by the A/D converter 102, the interpolation cycle by the data interpolation circuit 104, i.e., the frequency of the over-sampling clock, and the transmission clock frequencies corresponding to the respective types of text broadcastings. Using these frequencies, the judgement unit 912 judges the type of text broadcasting from the clock run-in cycle 912a obtained by the clock run-in cycle detection circuit 904, and obtains a transmission clock cycle according to the judged text broadcasting. Then, the judgement unit 912 calculates a sampling pulse interval value 912b that matches the transmission clock cycle, using the number of over-sampling clocks as a unit, and outputs the sampling pulse interval value 912b to a sampling position calculation circuit 906, a sampling start pulse generation circuit 902, and a phase error detection circuit 809.

The sampling start pulse generation circuit 902 generates a sampling start pulse S902 indicating the sampling start position, on the basis of the sampling pulse interval value 912b according to the type of text broadcasting supplied from the judgement unit 912, the binary original signal S107a, and the binary interpolation signal S107b, within the period of the sampling start position gate pulse S901. To be specific, a change point at which the binary original signal S107a and the binary interpolation signal S107b change from 0 to 1 is detected within the period of the sampling start position gate pulse S901, and a sampling start pulse S902 is generated in a position shifted backward from this change point by the first interval that is described for the first embodiment.

An OR circuit 905 is means to synthesize the sampling start pulse S902 and the phase error correction pulse S809 generated by the phase error detection circuit 809. A sampling position calculation circuit 906 sequentially calculates sampling positions S906 according to the sampling pulse interval value 912b obtained by the judgement unit 912, starting from a synthesis start pulse S905 generated by the OR circuit 905. The unit of each sampling position S906 is the number of over-sampling clocks.

A sampling pulse conversion circuit 907 optimizes each sampling position S206. That is, when the value of the sampling position S206 is a decimal, the pulse conversion circuit 907 converts the decimal to an integer. Then, based on the integral sampling position, the pulse conversion circuit 907 generates an initial sampling pulse S108a indicating the positions of data to be sampled from the binary original signal S107a and the binary interpolation signal S107b, and a sampling data selection pulse S108b indicating which data is to be selected between the binary original signal S107a and the binary interpolation signal S107b according to the initial sampling pulse S108a, and then outputs the signals S108a and S108b to the sampling pulse correction circuit 109.

When the sampling position S906 is a decimal, the sampling pulse generation circuit 907 converts the decimal to an integer, and generates pulses specifying a text data sampling position. To be specific, the sampling pulse generation circuit 907 outputs an initial sampling pulse S808b generated on the basis of the sampling start pulse S902, and a sampling pulse S808c generated on the basis of the synthesis start pulse S905. Further, since the text signal is processed in parallel using double interpolation, the sampling pulse conversion circuit 907 outputs a sampling data selection pulse S808d for data selection between the binary original signal S107a and the binary interpolation signal S107b, in addition to the sampling pulse S808c. The initial sampling pulse S808b is inputted to the phase error detection circuit 809, and the sampling pulse S808c and the sampling data selection pulse S808d are inputted to the sampling circuit 111.

FIGS. 17(a)–17(h) are timing charts for explaining the operation of the sampling pulse generation circuit 808. Hereinafter, the operations of the respective blocks in the sampling pulse generation circuit 808 will be described.

Figure 17:
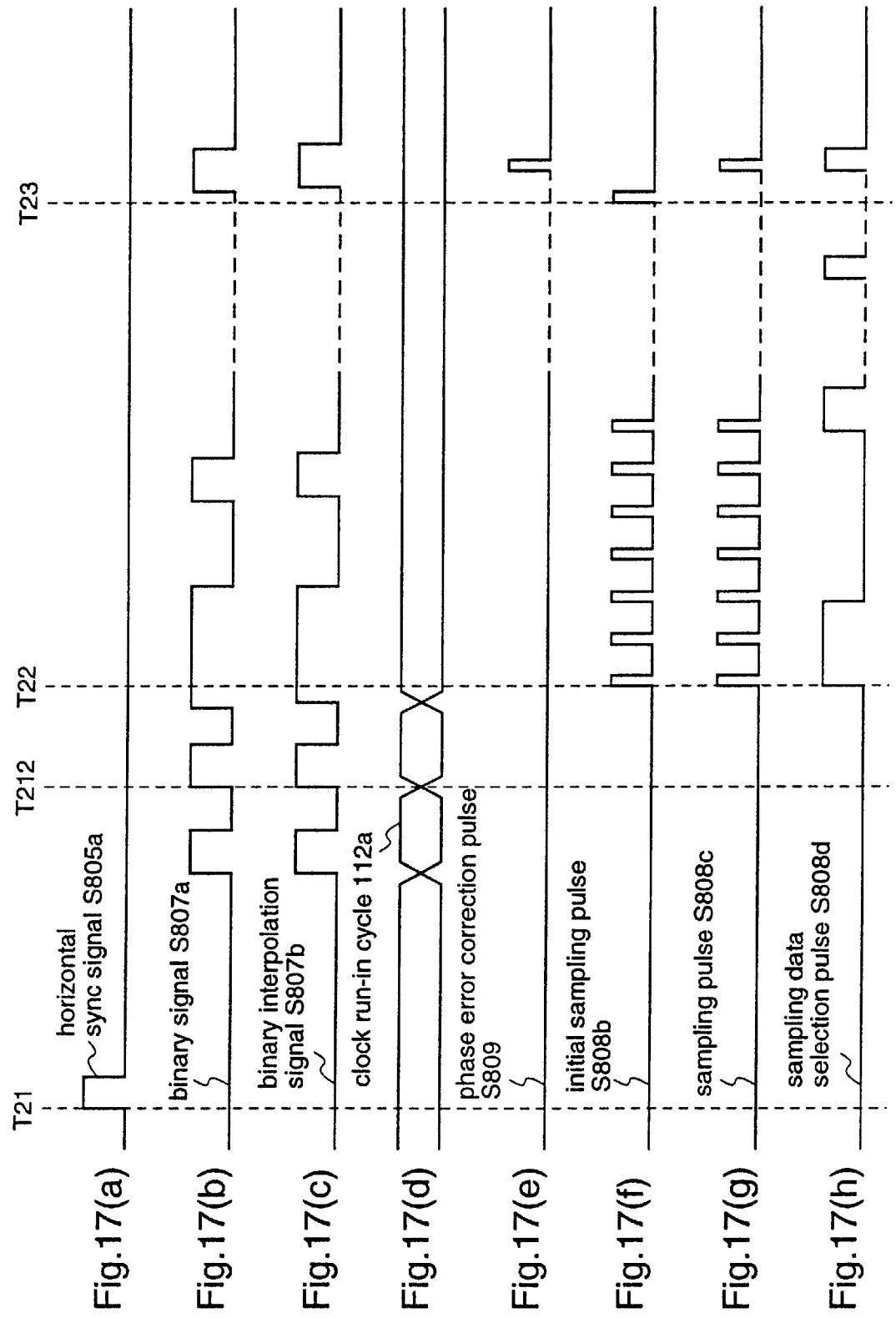
FIGS. 17(a)–17(h) are timing charts for explaining the operation of the broadcast text data sampling apparatus of the third embodiment.

As shown in FIG. 17(a), at time T21, the horizontal sync signal S105a is separated. At time T212, a change point, at which the binary original signal S107a shown in FIG. 17(b)

and the binary interpolation signal S107b shown in FIG. 17(d) change from 0 to 1, is detected within the clock run-in period shown in FIG. 17(d). The clock run-in cycle detection circuit 904 detects the number of sampling clocks between the change points within the clock run-in period, as a clock run-in cycle 912a.

The judgement unit 912 judges the type of text broadcasting on the basis of the clock run-in cycle 912a, and calculates a sampling pulse interval value 912b.

At time T22 within the period of the sampling start position gate pulse S901 that is set in the vicinity of the position between the clock run-in period and the framing code period, the sampling start pulse generation circuit 902 generates a sampling start pulse S902 on the basis of the sampling pulse interval value 912b, the binary original signal S107a, and the binary interpolation signal S107b. This sampling start pulse S902 is generated at a position that is shifted by the above-mentioned first interval, i.e., ½ of the sampling pulse interval value 912b, from the 0-to-1 change point of the binary original signal S107a and the binary interpolation signal S107b.

Assuming that no phase error occurs at time T22, since no phase error correction pulse S809 is inputted to the OR circuit 905, the OR circuit 905 outputs the sampling start pulse S902 as a synthesis start pulse S905 to the sampling position calculation circuit 906.

The sampling position calculation circuit 906 calculates sampling positions on the basis of the sampling pulse interval value 912b, starting from the sampling start pulse S902 generated at time T22. The sampling pulse conversion circuit 907 generates an initial sampling pulse S808b shown in FIG. 17(f), a sampling pulse S808c shown in FIG. 17(g) which is the same pulse as the initial sampling pulse S808b, and an initial sampling data selection pulse S808d shown in FIG. 17(h) indicating which data is to be sampled between the binary original signal S107a and the binary interpolation signal S107b.

Assuming that a phase error occurs at time T23, a phase error correction pulse S809 shown in FIG. 17(e) indicating the position where the phase error occurs, is supplied from the phase error detection circuit 809 to the OR circuit 905. This phase error correction pulse S809 is outputted from the OR circuit 905, and the sampling position S906 calculated by the sampling position calculation circuit 906 is set as the phase error correction pulse S809 immediately after time T23. After time T23, a sampling pulse and a sampling data selection pulse, which are generated with the position of the phase error correction pulse S809 as the sampling start position, are outputted as a sampling pulse S808c and a sampling data selection pulse S808d as shown in FIGS. 17(g) and 17(h), respectively. That is, when a phase error is detected, the sampling pulse generation circuit 808 deals with the phase error by correcting the sampling pulse position S906.

Figure 18:
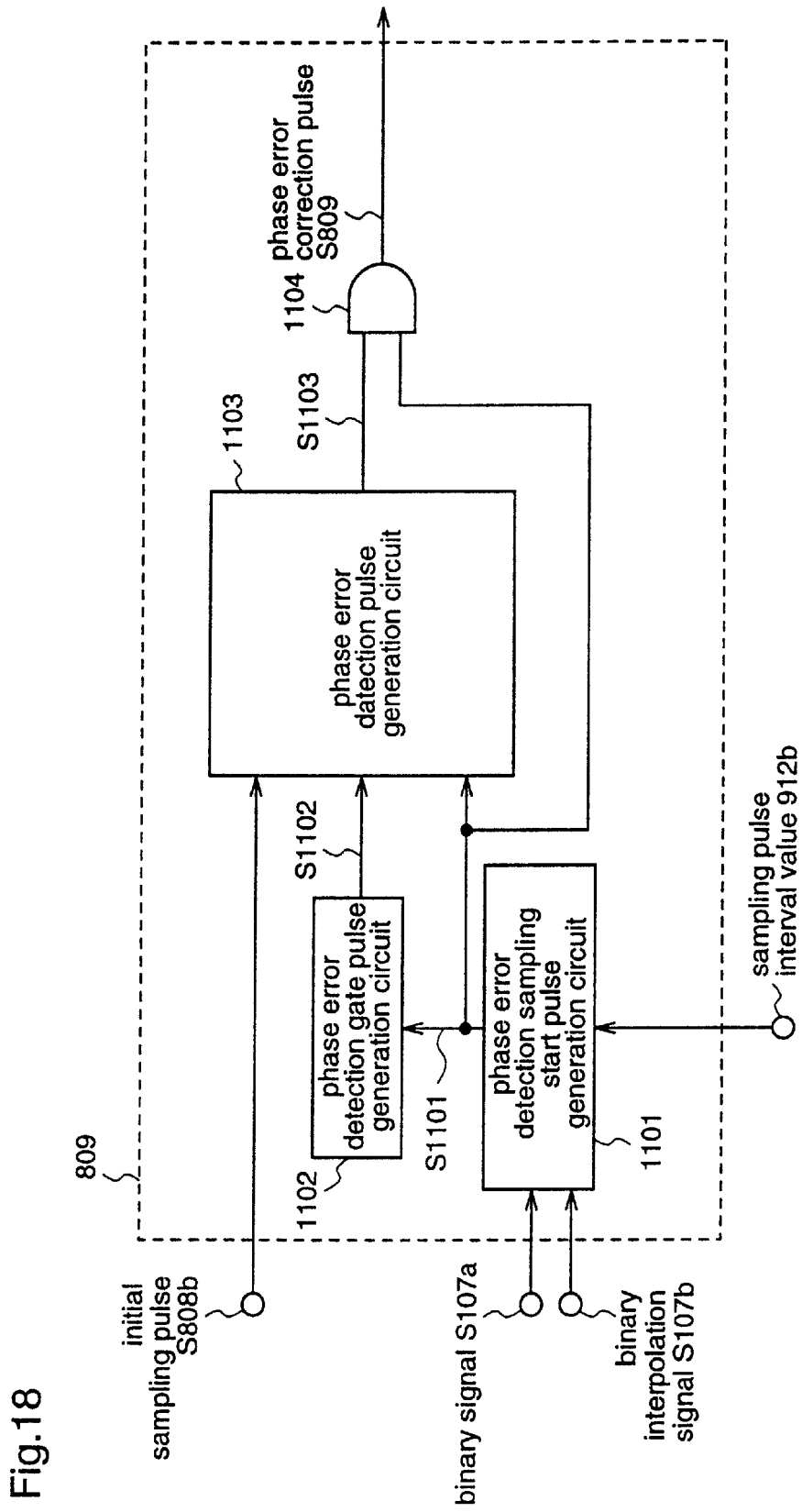
FIG. 18 is a block diagram illustrating the construction of a phase error detection circuit included in the broadcast text data sampling apparatus of the third embodiment.

FIG. 18 is a block diagram illustrating the internal construction of the phase error detection circuit 809. In FIG. 18, the same reference numerals as those shown in FIG. 15 denote the same or corresponding parts. A phase error detection sampling start pulse generation circuit 1101 sequentially detects 0-to-1 change points of the binary original signal S107a and the binary interpolation signal S107b which are generated in the binarization circuit 107, and generates a phase error detection sampling start pulse S1101 for phase error detection, in a position shifted from each detected change point by the above-mentioned first interval, i.e., ½ of the sampling pulse interval value 912b.

A phase error detection gate pulse generation circuit 1102 generates a phase error detection gate pulse S1102 having a sampling clock width of ±N with respect to the position of the phase error detection sampling start pulse S1101, as described for the second embodiment.

A phase error detection pulse generation circuit 1103 detects a phase error between the initial sampling pulse S808b generated by the sampling pulse generation circuit 808 and each phase error detection sampling start pulse S1101, and generates, as a phase error detection pulse S1103, a phase error detection gate pulse S1102 at a position where the phase error occurs. Whether a phase error occurs or not is judged depending on whether the initial sampling pulse S808b is included in the phase error detection gate pulse S1102 that is generated on the basis of a predetermined phase error detection sampling start pulse S1101, as described for the second embodiment.

An AND circuit 1104 generates, as a phase error correction pulse S809, a phase error detection sampling start pulse S1101 that exists within the period during which the phase error detection pulse S1103 is being outputted. The phase error correction pulse S809 is outputted to the sampling pulse generation circuit 808.

FIGS. 19(a)–19(d) are timing charts for explaining the operation of the phase error detection circuit 809. In FIGS. 19(a)–19(d), the same reference numerals as those shown in FIGS. 17(a)–17(h) designate the same or corresponding parts. FIGS. 19(a)–19(d) show the case where, after an initial sampling pulse S808b is generated at time T22, a signal phase error occurs at time T13. Hereinafter, the operation of the phase error detection circuit 809 will be described with reference to FIGS. 18 and 19(a)–19(d).

Figure 19:
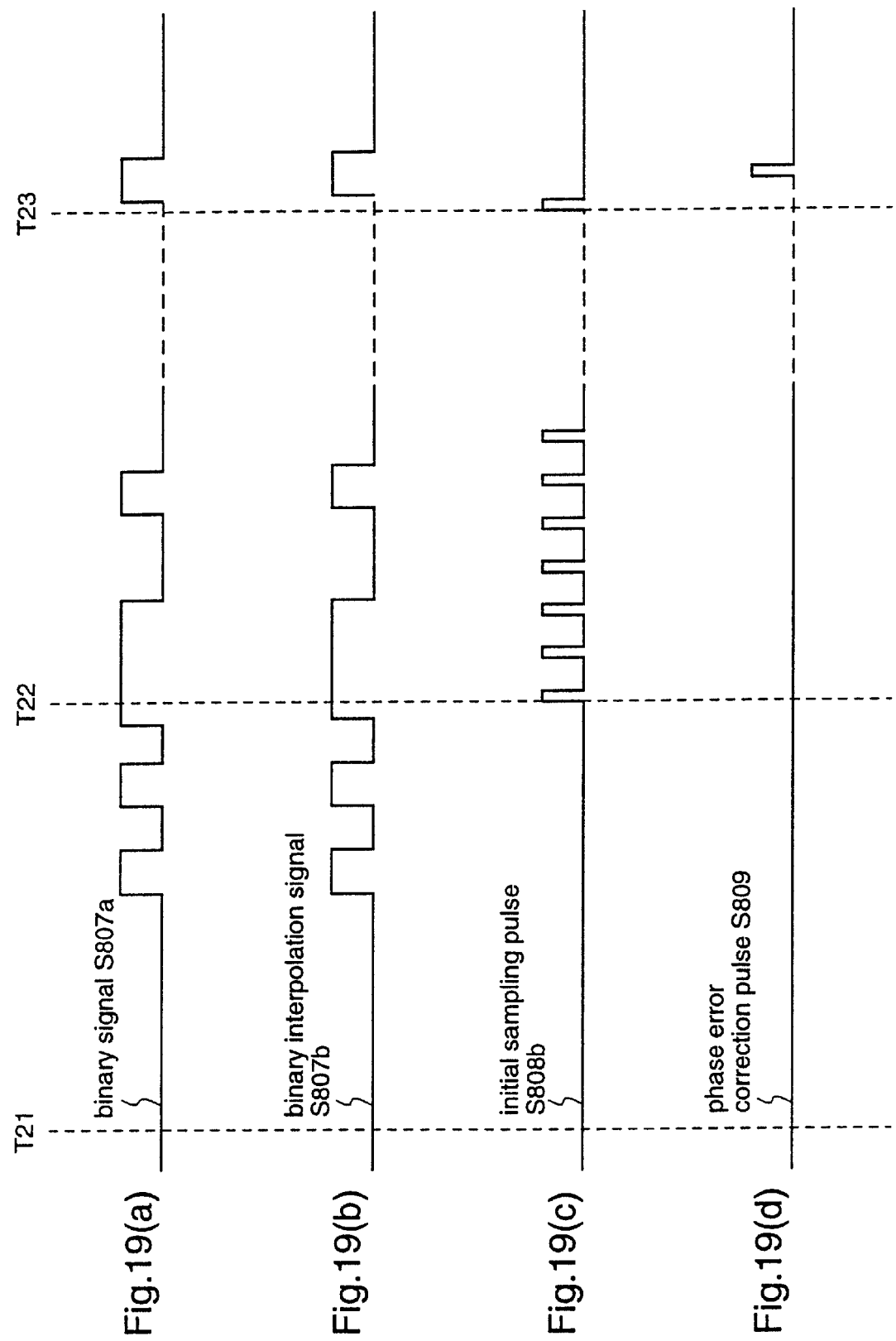
FIGS. 19(a)–19(d) are timing charts for explaining the operation of the phase error detection circuit according to the third embodiment.

The phase error detection sampling start pulse generation circuit 1101 detects 0-to-1 change points of the binary original signal S807a and the binary interpolation signal S807b shown in FIGS. 19(a) and 19(b), respectively, and generates a phase error detection sampling start pulse S1101 at a position shifted by ½ of the sampling pulse interval value 112b from each change point.

When a phase error occurs at time T23, a phase difference is generated between the initial sampling pulse S808b shown in FIG. 19(c) and the phase error detection sampling start pulse S1101. The phase error detection pulse generation circuit 1103 detects this phase error, and outputs, as a phase error correction pulse S809 shown in FIG. 19(d), a phase error detection sampling start pulse S1101 corresponding to time T23 at which the phase error occurs. The sampling pulse generation circuit 808 shown in FIG. 16 selects, as a sampling pulse S808c after time T23 at which the phase error is detected, a sampling pulse that is generated starting from the position of the phase error correction pulse S809.

As described above, according to the third embodiment of the present invention, phase error detection is carried out on the basis of the initial sampling pulse S808b, and when a phase error is detected, a phase error correction pulse S809 is outputted. When the phase error correction pulse S809 is inputted, a pulse is calculated on the basis of the sampling pulse interval value 912b, starting from the phase error correction pulse S809, and this pulse is outputted as a sampling pulse S808c. Therefore, a sampling pulse corresponding to the phase error is generated by feeding the information that the phase error is detected, back to the sampling pulse generation. Further, since such feedback is not carried out when no phase error is detected, the initial sampling pulse S808 is outputted as a sampling pulse. As the result, even when a phase error occurs in the text signal in the middle of the line due to group delay or the: like, data of the text broadcasting can be sampled with high precision. Further, since a multi-tap filter is not required, the circuit scale is not increased.

In the first to third embodiments of the invention, the broadcast text data sampling apparatuses are constituted by hardware. However, the same constructions as those mentioned for the first to third embodiments may be implemented by software using an apparatus having a processor, with the same effects as described above.

Further, although the first to third embodiments of the present invention are described with respect to a teletext signal, since the feature of the present invention resides in that one broadcast text data sampling apparatus can deal with plural types of text broadcasting, the data sampling apparatus of the present invention is also applicable to, for example, VPS and WSS in Europe, multiplexed teletext broadcasting in Japan, and closed caption in the United States, with the same effects as mentioned above.

[Embodiment 4]

Figure 20:
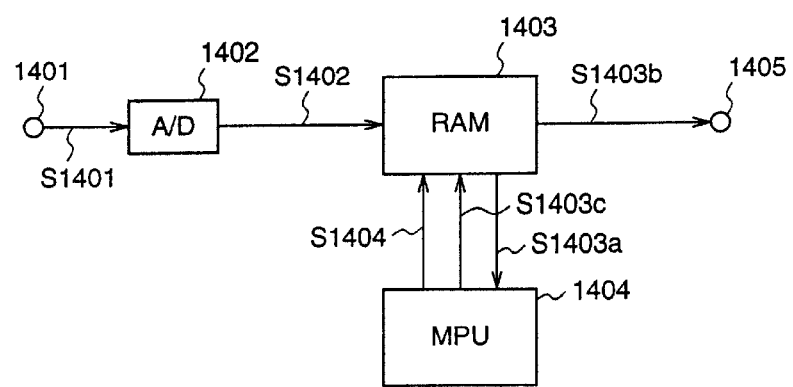
FIG. 20 is a block diagram illustrating the construction of a broadcast text data sampling apparatus according to a fourth embodiment of the present invention.

FIG. 20 is a block diagram illustrating the construction of a broadcast text data sampling apparatus according to a fourth embodiment of the present invention. An analog video signal S1401, in which broadcast text data is superimposed on a vertical blanking period, is inputted through a video signal input terminal 1401. An A/D converter 1402 converts the analog video signal into a digital signal S1402 using a sampling clock fs(MHz). A RAM (Random Access Memory) 1403 stores the digital signal S1402, and outputs data S1403b that is decoded according to the type of text broadcasting. Other storage means may be used instead of the RAM 1403. A micro processing unit 1404 accesses the RAM 1403 at a control signal S1404 to obtain memory data S1403a, and performs sampling of the text data and decoding of the sampled data. Then, the micro processing unit 1404 transmits the decoded data S1403c to the memory 1403. An output terminal 1405 sends the decoded data S1403b to a display circuit (not shown), wherein display according to the type of text broadcasting is carried out.

Figure 21:
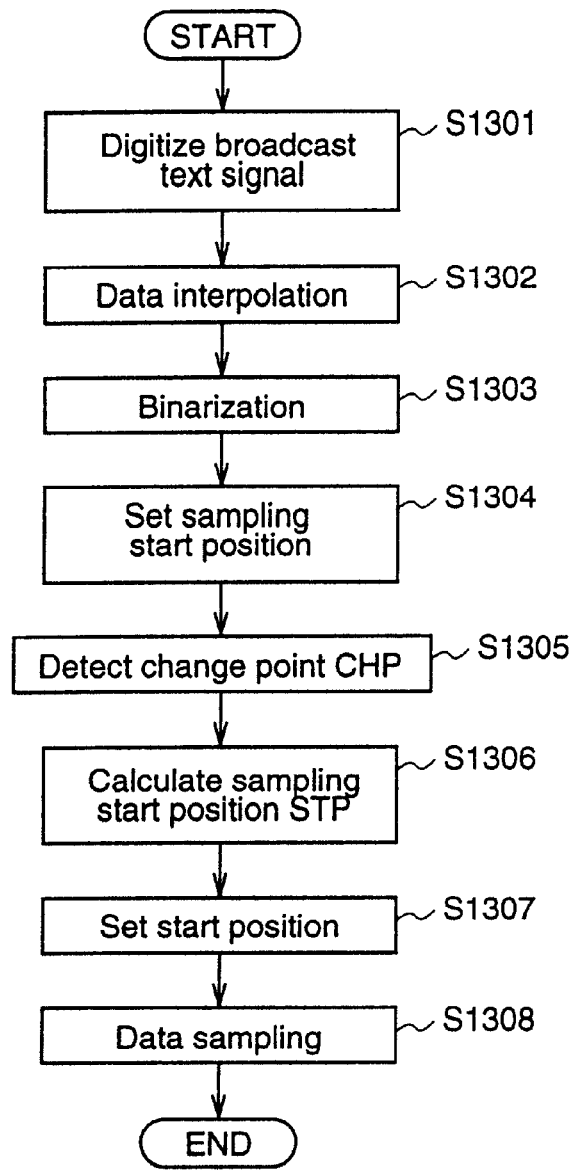
FIG. 21 is a flowchart for explaining a broadcast text data sampling method according to a fourth embodiment of the present invention.

FIG. 21 is a flowchart for explaining a broadcast text data sampling method according to a fourth embodiment of the present invention. Hereinafter, the broadcast text data sampling method will be described with reference to FIGS. 20 and 21. In this fourth embodiment, it is premised that the type of inputted text broadcasting and the cycle of its transmission clock are already known.

Initially, in digitization step S1301, a broadcast text signal is converted into digital data by the A/D converter 1402 to be stored in the RAM 1403. Next, in data interpolation step S1302, this digital data is interpolated using a predetermined interpolation process by the micro processing unit 1404 to generate original data and interpolation data. Then, in binarization step S1303, the original signal and the interpolation signal are respectively binarized with a predetermined slice level SL to convert these signals into a binary original signal and a binary interpolation signal, each comprising 0 and 1.

Subsequently, in sampling start position setting step S1304, a period of a predetermined length for determining a sampling start position is set between a clock run-in period that is a reference period for text data sampling clock generation, and a framing code period for identifying the type of text broadcasting. In change point detection step S1305, a 0-to-1 change point of the binary original data and the binary interpolation data, within the period for determining the sampling start position. In sampling start position calculation step S1306, a sampling start position STP is calculated on the based of the cycle of the transmission clock of the text data, with reference to the change point CHP. To be specific, a sampling start position STP is set in a position shifted from the change point CHP by the first interval described for the first embodiment. Since the cycle of the transmission clock is known in advance, the first interval may be any value so long as it is smaller than the transmission clock cycle. In this fourth embodiment, since the binary original signal and the binary interpolation signal are stored in the RAM 1403, the positions of data in these signals and the like are expressed by address positions in the RAM 1403.

Next, in start point setting step S1307, the sampling start position STP is set at a start point. Then, in sampling data processing step S1308, sampling positions are sequentially calculated, and text data existing in the positions are sequentially sampled, followed by a decoding process according to the type of the text broadcasting.

Figure 22:
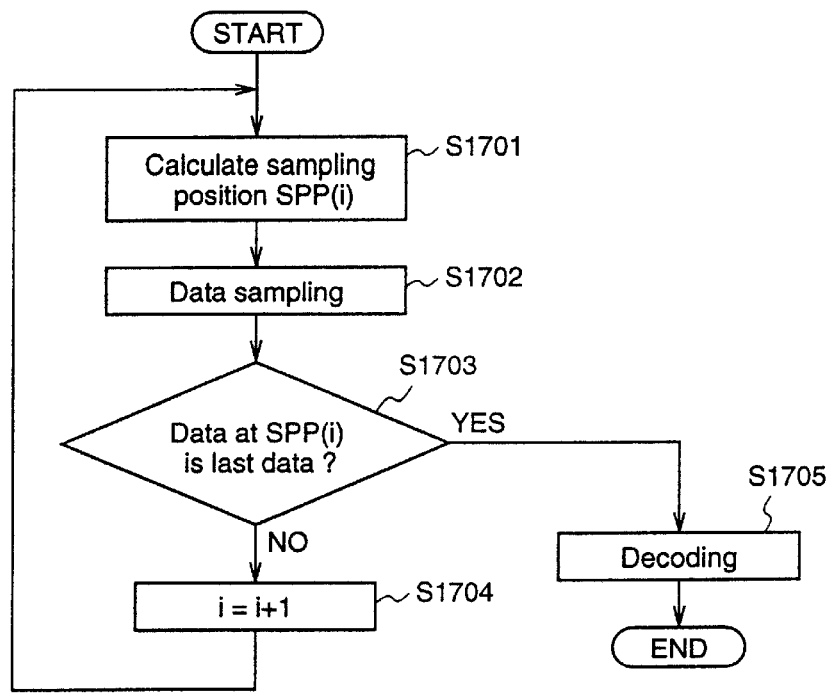
FIG. 22 is a flowchart for explaining the major part of the broadcast text data sampling method of the fourth embodiment.

FIG. 22 is a flowchart for explaining the sampling data processing step S1308 included in the broadcast text data sampling method according to the fourth embodiment. Hereinafter, the sampling data processing method will be described with reference to FIG. 22.

Initially, in sampling position calculation step S1707, an i-th data sampling position SPP(i) is calculated, starting from the sampling start position STP. Here, i is an integer not less than 0. In data sampling step S1702, either binary original data or binary interpolation data, which exists in the sampling position SPP(i), is sampled as sample data.

In end-of-data judgement step S1703, it is judged whether the text data is the last data or not. When it is judged that the text data is not the last data, the sampling position is incremented in position increment step S1704 and, thereafter, a sampling position SPP(i) is calculated in the sampling position calculation step S1701. When it is judged in the end-of-data judgement step S1703 that the text data is the last data, the sampled data are subjected to a decoding process according to the type of the text broadcasting.

Figure 23:
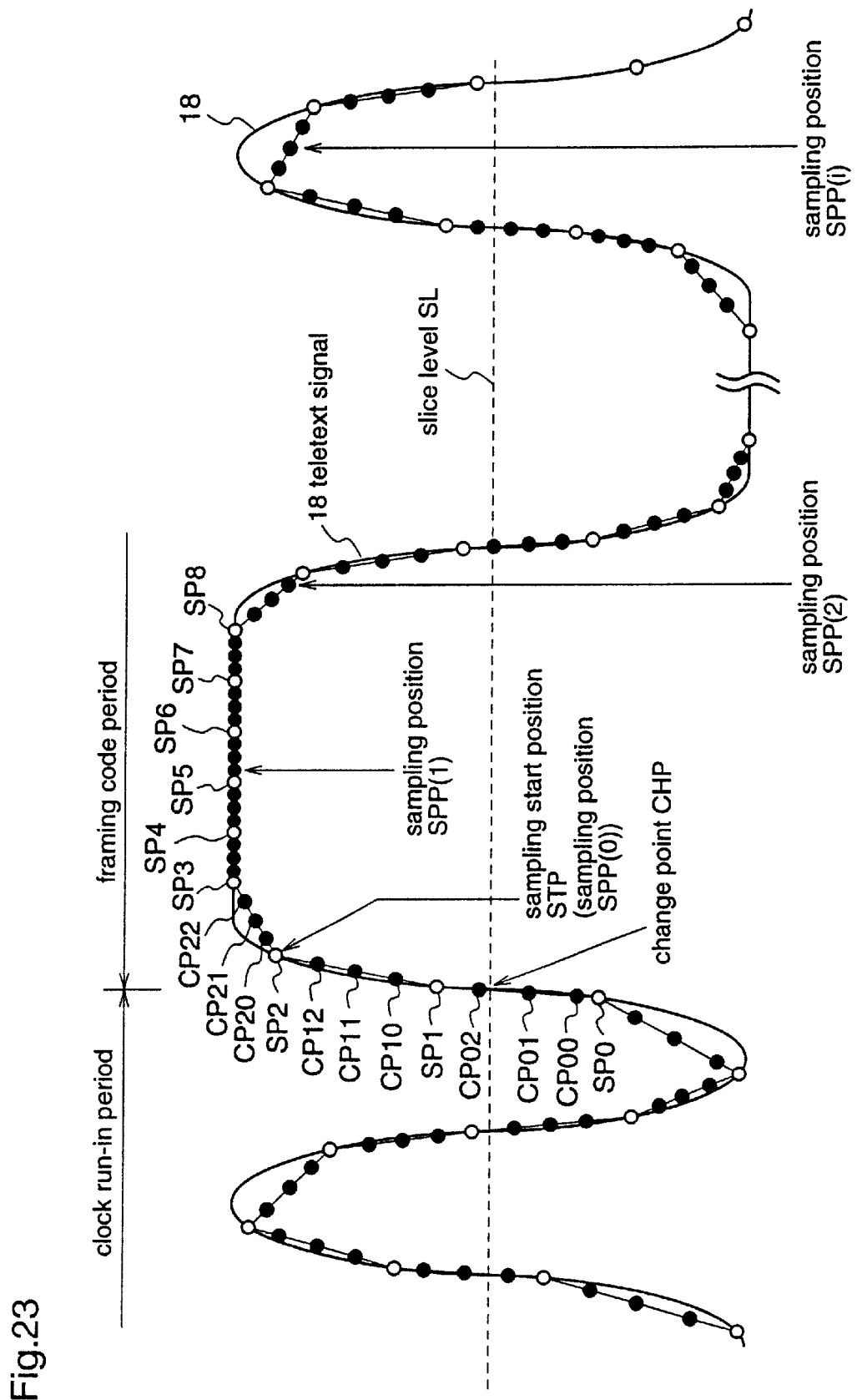
FIG. 23 is a schematic diagram for explaining the broadcast text data sampling method of the fourth embodiment.

FIG. 23 is a schematic diagram illustrating the relationship between a broadcast text signal and sampled text data, for explaining the sampling data processing method more specifically. A teletext signal is used as an example of a broadcast text signal. In FIG. 23, SPt (t: integer not less than 0) are original signals that are obtained by converting a teletext signal 18 into a digital signal using a sampling clock Fs(MHz), and other points indicated by white dots are also original signals. Further, signals generated by performing linear interpolation (in this embodiment, 4-times interpolation) between original signals SPt and SPt+1 are interpolation signals CPt0, CPt1, and CPt2.

Hereinafter, the teletext data sampling method will be described with reference to FIG. 23. Initially, linear interpolation is performed between A/D converted signals to generated interpolation data shown by black dots. For example, linear interpolation is performed between original signals SP0 and SP1 to generate interpolation data CP00~CP02. Subsequently, the original signals and the interpolation signals are converted into binary signals of 0 and 1, using the slice level SL. Further, a change point CHP at which the binary signal changes from 0 to 1 is detected. Then, a sampling start: position STP is obtained. The first interval between the detected change point CHP and the sampling start position STP is represented by the following formula (1) when the teletext transmission clock is fchr, the A/D conversion sampling clock is fs(MHz), and n-times interpolation that provides n-times (n: integer) amount of data including the original data is employed.

$$STP = \frac{fs \times n}{2 \times fchr} \quad (1)$$

In formula (1), the first interval is ½ of the transmission cycle of the teletext data.

Hereinafter, for simplification, the teletext data sampling method will be described using the sampling clock fs of 24 MHz, 4-times interpolation that provides 4-times amount of data including the original data, and the transmission clock fchr of 6.9375 MHz that is the transmission clock of teletext. Performing 4-times interpolation is equivalent to performing sampling at an over-sampling clock of 96 MHz that is 4×24 MHz and, therefore, the position from the change point CHP becomes 6.9189 based on the number of over-sampling clocks as a unit. Since the sampling point should be an integer, the fractional portion of 6.9189 from the change point CHP is discarded, resulting in 6 as the sampling start position STP. Although the fractional portion is discarded (rounded down), it may be rounded off to the nearest integer or rounded up, with the same effect as described above. In FIG. 23, the change point CHP corresponds to the interpolation data CP01, and the position of the original data SP2 that is 6 points to the right from the change point CHP corresponds to the sampling start position STP. That is, phase matching to the transmission clock of the teletext signal is carried out by calculating the sampling start position STP. Assuming that n-times interpolation is carried out starting from the sampling start position STP, the i-th sampling position SPP(i) is represented by the following formula (2).

$$SPP(i) = \frac{fs \times n \times i}{fchr} \quad (2)$$

As shown in FIG. 23, the sampling position SPP(0) corresponds to the sampling start position STP, and sampling data SPP(i) are sequentially calculated. In this fourth embodiment, sampling position SPP(i) are calculated at intervals of 13.8378. Since the sampling interval is a decimal, each sampling position SPP(i) is also expressed by a decimal. Accordingly, as data to be sampled, either binary original data or binary interpolation data, whichever is closest to the calculated sampling position SPP(i), is selected. The data to be selected is data existing in a position obtained by discarding the fractional portion of the sampling position SPP(i) represented by formula (2). Although the fractional portion is discarded (rounded down), it may be rounded off to the nearest integer or rounded up, with the same effect as mentioned above. In FIG. 23, the position of 13th data from the sampling start position STP is sampling position SPP(1), and the position of 27th data from the sampling start position STP is sampling position SPP(2). In this fourth embodiment, precise data sampling is carried out by designating the positions of sampling data that are closest to the sampling positions SPP(i) at intervals equivalent to the transmission clock of the teletext signal. The sampled data are subjected to a decoding process according to the type of the text broadcasting (teletext).

As described above, according to the fourth embodiment of the present invention, a change point CHP at which the binary signal changes from 0 to 1 is detected, and sampling positions are calculated on the basis of the cycle of the transmission clock, starting from a sampling start position based on the change point CHP. Therefore, even when the data in the clock run-in period have completely gone due to distortion in the transmission system, precise sampling positions can be set so long as the data after the framing code exist. Accordingly, precise sampling of text data is realized without being affected by degradation of the signal due to distortion in the transmission system or the like.

[Embodiment 5]

Figure 24:
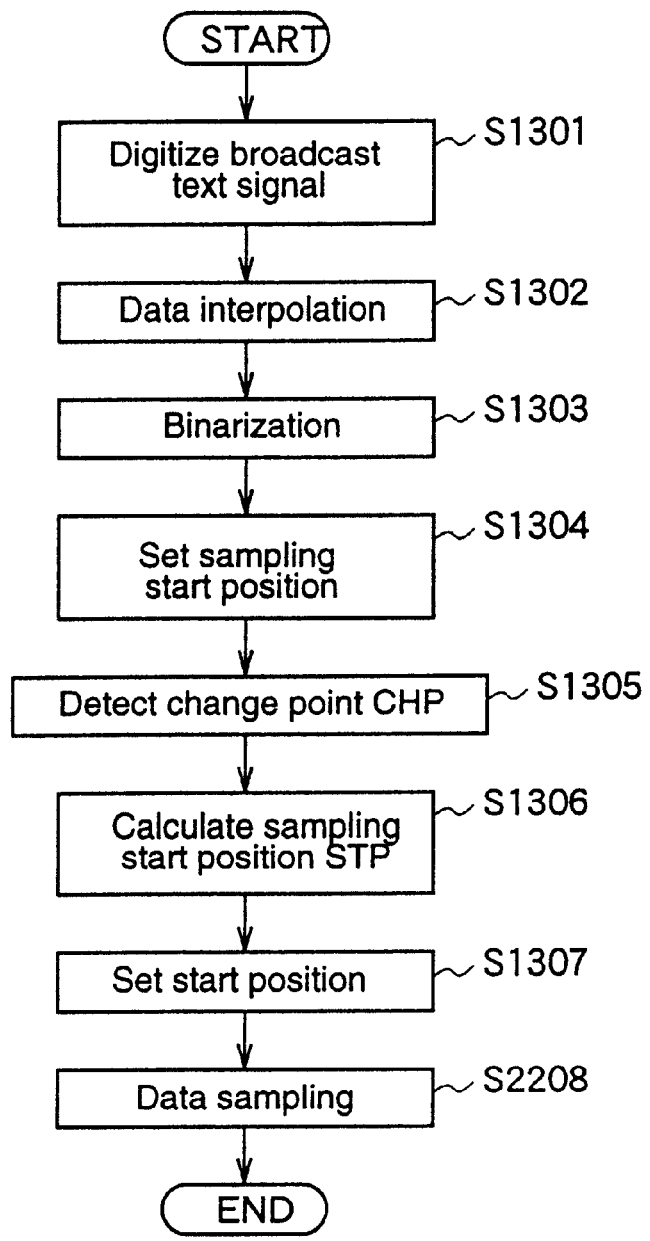
FIG. 24 is a flowchart for explaining a broadcast text data sampling method according to a fifth embodiment of the present invention.

FIG. 24 is a flowchart for explaining a broadcast text data sampling method according to a fifth embodiment of the present invention. In FIG. 24, the same reference numerals as those shown in FIG. 21 designate the same or corresponding parts. The broadcast text data sampling method of this fifth embodiment employs, instead of the sampling data processing step S1308 of the fourth embodiment, sampling data processing step S2208 in which sampling positions are corrected according to a phase error in text data. The broadcast text data sampling method of this fifth embodiment is also executed by the same apparatus as described for the fourth embodiment.

Figure 25:
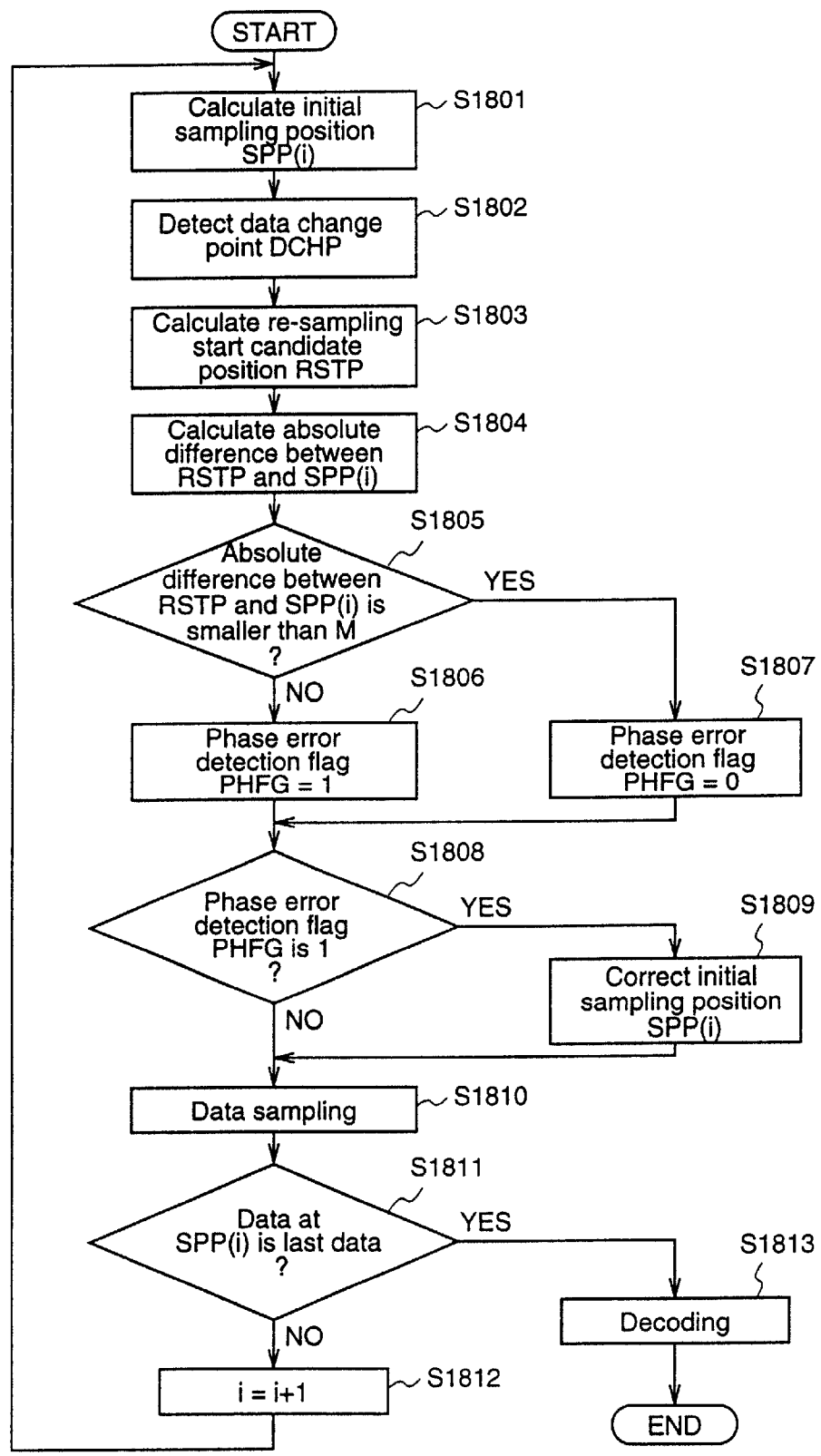
FIG. 25 is a flowchart for explaining the major part of the broadcast text data sampling method of the fifth embodiment.

FIG. 25 is a flowchart for explaining the sampling data processing step S2208 according to this fifth embodiment. Hereinafter, the text data sampling method will be described with reference to FIGS. 24 and 25. In this fifth embodiment, the same or corresponding steps as/to those of the text data sampling method of the fourth embodiment will not be described repeatedly.

After a sampling start position STP is set in a start point of sampling position calculation (start point setting step S1307), i-th sampling positions SPP(i) are sequentially calculated on the basis of the transmission clock that is known in advance, starting from the sampling start position STP, in initial sampling position SPP(i) calculation step S1801. This calculation is carried out in the same manner as described with respect to step S1701 shown in FIG. 22 according to the fourth embodiment.

Subsequently, in data change point detection step S1802, a change point DCHP at which the binary original signal and the binary interpolation signal of the text signal change from 0 to 1, is detected.

In re-sampling start candidate position calculation step S1803, a re-sampling start candidate position RSTP is calculated on the basis of the change point DCHP. To be specific, a position shifted from the change point DCHP by the interval between the change point CHP and the sampling start position STP (i.e., the above-mentioned first interval), is calculated as a re-sampling start candidate position RSTP.

In correlation calculation step S1804, the absolute value of a difference between the re-sampling start candidate position RSTP and a sampling position SPP(i) closest to this candidate position RSTP is calculated. Then, in correlation judgement step S1805, the absolute difference value between the re-sampling start candidate position RSTP and the sampling position SPP(i) is compared with a predetermined value M to judge the correlation. When the absolute difference value is smaller than M, a phase error detection flag PHFG is set to 0 in second phase error detection flag setting step S1807. Otherwise, it is judged that an phase error occurs, and the phase error detection flag PHFG is set to 1 in first phase error detection flag setting step S1806. The value M is a criterion for judging whether there is a positional error between the re-sampling start candidate position RSTP and the sampling position SPP(i), and it is set according to the precision of positional error detection or the like. For example, in the case where it is judged that no positional error occurs only when the positions RSTP and SPP(i) match, 0 is used as the value of M.

In phase error detection step S1808, when the phase error judgement flag PHFG is 1, the initial sampling position SPP(i) is corrected in sampling position correction step S1809. When the phase error judgement flag PHFG is 0, no correction is carried out.

To be specific, in the sampling position correction step S1809, when the phase error judgement flag PHFG is 1, corrected sampling positions are sequentially calculated on the basis of the transmission clock cycle that is known in advance, starting from the re-sampling start candidate position RSTP, in the same manner as described for the initial sampling position SPP(i) calculation step S1801. Subsequent to the position where the phase error is detected, the corrected sampling positions are outputted instead of the initial sampling positions SPP(i).

In data sampling step S1810, sampling of data is carried out on the basis of the initial sampling positions SPP(i) or the sampling positions corrected in the position correction step S1809.

Then, in end-of-data judgement step S1811, it is judged that the data to be sampled is the last text data or not. When it is the last data, the sampled data are subjected to a decoding process according to the type of the text broadcasting in decoding step S1813. When it is not the last data, the sampling position is incremented in position increment step S1812, followed by sequential calculation of sampling positions and sequential data sampling.

Figure 26:
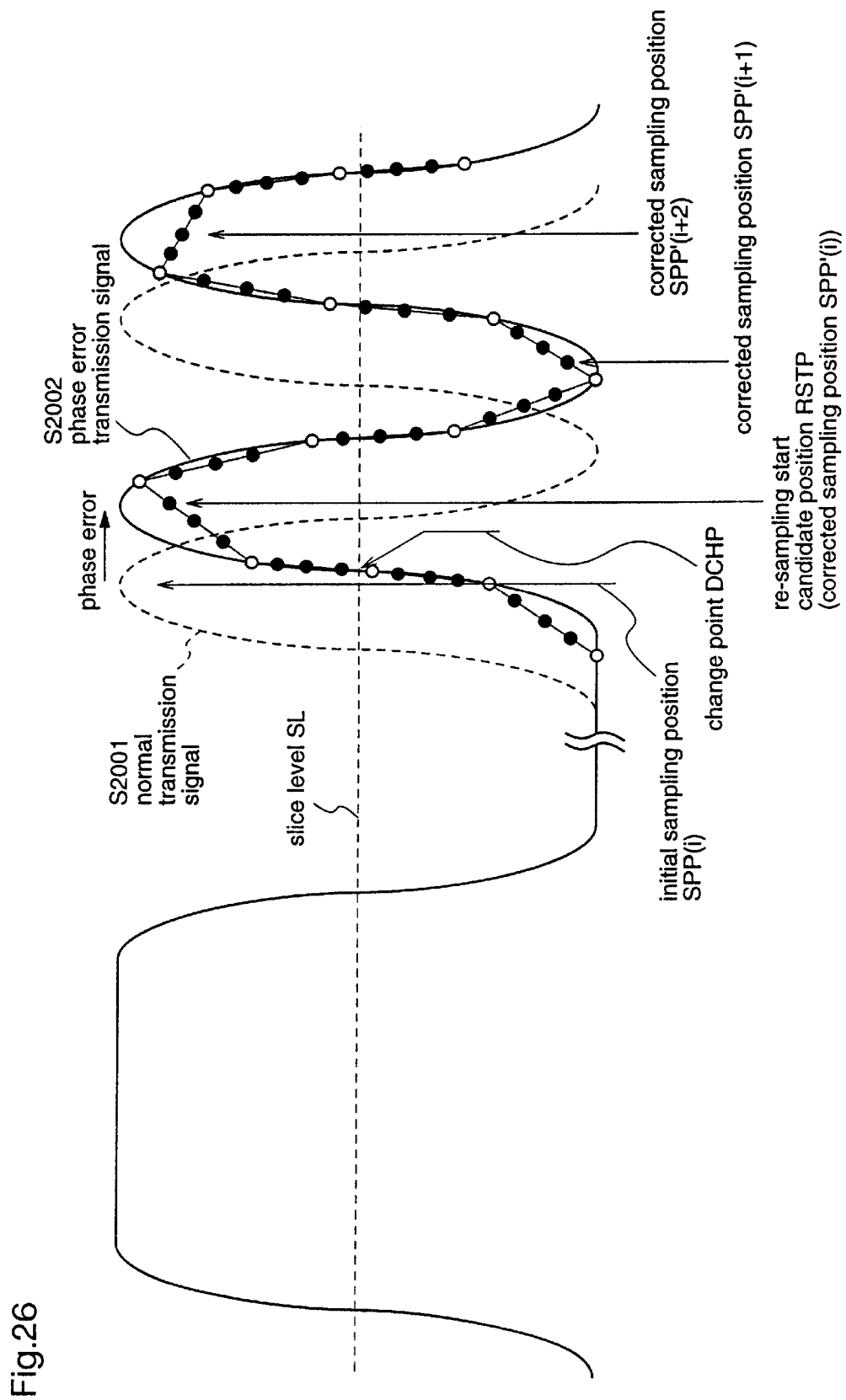
FIG. 26 is a schematic diagram for explaining the broadcast text data sampling method of the fifth embodiment.
Figure 27:
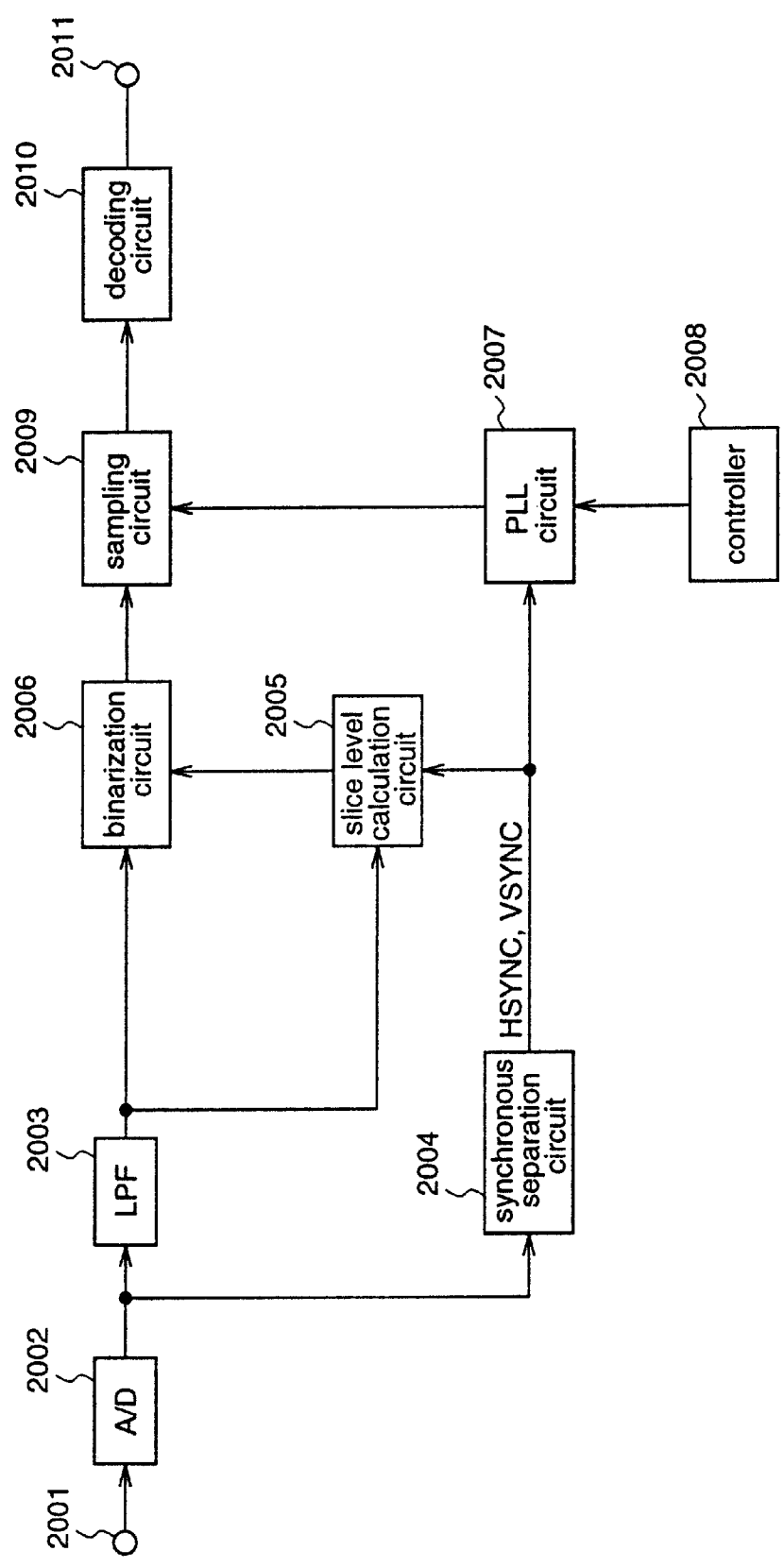
FIG. 27 is a block diagram illustrating the construction of the conventional broadcast text data sampling apparatus.

FIG. 26 is a schematic diagram for specifically describing the broadcast text data sampling method according to the fifth embodiment. In FIG. 26, a signal waveform shown by a dotted line indicates a normal transmission signal S2001 having no phase error, and a signal waveform shown by a solid line indicates a phase error transmission signal S2002 having a phase error. It is assumed that these signals are teletext signals. Further, white dots indicate original signals while black dots indicate interpolation signals. Hereinafter, a description will be given of sampling of teletext data in the case where a phase error occurs in the teletext signal, according to the broadcast text data sampling method of the fifth embodiment.

With reference to FIG. 26, the phase of the teletext signal that is transmitted at the transmission clock of 6.9375 MHz is sometimes shifted due to group delay or the like in the transmission system. In this case, even when synchronization of the sampling pulse is performed in the clock run-in period of the teletext signal, sampling error occurs due to the phase error. That is, when sampling positions SPP(i) are calculated starting from the sampling start position STP, although accurate sampling positions are obtained for the normal transmission signal S2001, inaccurate sampling positions are obtained for the phase error transmission signal S2002, resulting in sampling error.

In this fifth embodiment, however, a change position DCHP at which the binary signal of the teletext signal changes from 0 to 1 is detected, and re-sampling start candidate position RSTP is calculated on the basis of the transmission clock of the teletext signal, with the change point DHCP as a reference point. The re-sampling start candidate position RSTP is set in a position shifted by, as the first interval, ½ of the transmission clock cycle. The initial sampling position SPP(i) calculated starting from the sampling start position STP is different from the re-sampling start candidate position RSTP at the point where the phase error occurs. When no phase error occurs, the absolute value of a difference between the initial sampling position SPP(i) and the re-sampling start candidate position RSTP is approximately 0. However, when a phase error occurs, it becomes larger than a predetermined value. Therefore, when the absolute difference value is larger than a predetermined value M, it is judged that a phase error occurs, and the phase error detection flag PHFG is set to 1 in the first phase error detection flag setting step 1806.

When the phase error detection flag PHFG is set to 1, the sampling position in the memory, that has been the initial sampling position SPP(i), is corrected to a corrected sampling position SPP'(i) corresponding to the re-sampling start candidate position RSTP. Thereafter, corrected sampling positions SPP'(i+1), SPP'(i+2), . . . are sequentially calculated starting from the re-sampling start candidate position RSTP.

As described above, according to the fifth embodiment of the present invention, a re-sampling start candidate position RSTP is calculated on the basis of a change point at which the binary signal changes from 0 to 1, and phase error detection is carried out using the re-sampling start candidate position RSTP. When a phase error is detected, sampling positions are corrected on the basis of the re-sampling start candidate position RSTP and data are sampled from the corrected sampling positions. Therefore, even when a phase error occurs in the teletext signal in the middle of the line due to group delay or the like, precise sampling of teletext data can be performed.

Although the fourth and fifth embodiments are described with respect to a teletext signal, the present invention is applicable to other text broadcastings, for example, VPS or WSS in Europe, multiplexed teletext broadcasting in Japan, and closed caption in the United States, with the same effects as mentioned above.

Although, in the second to fifth embodiments, double interpolation that provides double amount of data or 4-times interpolation that provides 4-times amount of data is employed as an example of interpolation performed by the data interpolation circuit, the present invention is also applicable to n-times interpolation (n: integer) such as 3-times interpolation, 5-times interpolation, 8-times interpolation, etc., with the same effects as mentioned above.

Although, in the second to fifth embodiments, linear interpolation is employed as an example of an interpolation method, other interpolation methods, such as secondary convolution interpolation, Lagrange interpolation, and the like, may be employed with the same effects as described above.

Furthermore, in the present invention, the broadcast text data sampling method according to any of the first to fifth embodiments may be executed by a computer as a broadcast text data sampling program. Further, such program may be provided as a computer-readable data recording medium. Also in these cases, the same effects as described above are achieved.

What is claimed is:

1. A broadcast text data sampling apparatus, comprising:
   A/D conversion means for sampling a broadcast text signal supplied from outside the apparatus, with a sampling clock of a predetermined frequency, to convert the text signal into digital data;
   binarization means for converting the digital data into a binary signal;
   sampling pulse generation means for:
     detecting the cycle of clock run-in of the broadcast text signal from the binary signal,
     obtaining a text data sampling interval value on the basis of the clock run-in cycle,
     sequentially calculating positions of data in the binary signal, which data are positioned at intervals close to the sampling interval value, starting from a predetermined sampling start position,
generating a sampling pulse that designates the calculated data positions as data sampling positions, and
sampling means for sampling text data from the binary signal on the basis of the sampling pulse;
phase error detection means for:
detecting a change point of the binary signal after generating the sampling pulse,
generating a phase error detection sampling start pulse for phase error detection, on the basis of a change point and the sampling interval value,
comparing the phase error detection sampling start pulse with the sampling pulse, and
when a phase error between the phase error detection sampling start pulse and the sampling pulse is detected during sampling the test data, outputting a phase error correction pulse indicating a position where the phase error occurs, and a sampling pulse selection signal indicating that the phase error occurs;
and sampling pulse correction means for:
receiving the sampling pulse, the sampling interval value, the phase error correction pulse, and the sampling pulse selection signal,
outputting the sampling pulse as a corrected sampling pulse when the sampling pulse selection signal is not supplied from the phase error detection means, and
sequentially calculating, when the sampling pulse selection signal is supplied, positions of data within the binary signal, which data are positioned at intervals close to the sampling interval value, starting from a position that is indicated by the phase error correction pulse outputted from the phase error detection means, and generating a pulse that designates the calculated data positions as data sampling positions, and outputting said generated pulse as a corrected sampling pulse,
wherein said sampling means is for sampling the text data on the basis of the corrected sampling pulse.

2. A broadcast text data sampling apparatus, comprising:
phase error detection means for:
detecting a change point of the binary signal after generating the sampling pulse,
generating a phase error detection sampling start pulse for phase error detection, on the basis of a change point and the sampling interval value,
comparing the phase error detection sampling start pulse with the sampling pulse, and
outputting a phase error correction pulse indicating a position where the phase error occurs, and a sampling pulse selection signed indicating that the phase error occurs, when a phase error between the phase error detection sampling start pulse and the sampling pulse is detected during sampling the text data;
wherein said sampling pulse generation means is for sequentially calculating, aft er receiving the phase error correction pulse, positions of data with in the binary signal, which data are positioned at intervals closest to the sampling interval value, starting from the position indicated by the phase error correction pulse, and generating a pulse that designates the calculated data positions as data sampling positions, and then outputting said generated pulse as the sampling pulse to the sampling means.

3. A broadcast text data sampling apparatus, comprising:
A/D conversion means for sampling a broadcast text signal supplied from outside the apparatus, with a sampling clock of a predetermined frequency, to convert the text signal into digital data;
binarization means for converting the digital data into a binary signal;
sampling pulse generation means for:
detecting the cycle of clock run-in of the broadcast text signal from the binary signal,
obtaining a text data sampling interval value on the basis of the clock run-in cycle,
sequentially calculating positions of data in the binary signal, which data are positioned at intervals close to the sampling interval value, starting from a predetermined sampling start position, and
generating a sampling pulse that designates the calculated data positions as data sampling positions,
sampling means for sampling text data from the binary signal on the basis of the sampling pulse;
wherein said sampling pulse generation means comprises:
clock run-in position setting means for designating a position of a clock run-in period in the broadcast text signal;
clock run-in cycle detection means for detecting a cycle of the clock run-in in the clock run-in period, from the binary signal;
judgment means for judging a type of the broadcast text signal from the clock run-in cycle detected by the clock run-in cycle detection means, and for outputting a text data sampling interval value which is predetermined according to the type of the broadcast text signal;
sampling start period setting means for setting a sampling start period for setting the predetermined sampling start position, within a period in a vicinity of the position between the clock run-in and a framing code in the broadcast text signal;
sampling start pulse generation means for detecting a change point at which the binary signal changes from 0 to 1 within the sampling start period, and generating a sampling start pulse indicating the predetermined sampling start position that is shifted from the change point by an interval smaller than the sampling interval value;
sampling position calculation means for sequentially calculating the positions in the binary signal, which positions are separated at intervals equal to the sampling interval value, starting from the predetermined sampling start position indicated by the sampling start pulse; and
pulse conversion means for calculating data in the binary signal, which data are present in positions close to the respective positions calculated by the sampling position calculation means, and generating the sampling pulse that designates the calculated data positions as data sampling positions.

4. A broadcast text data sampling apparatus, comprising:
A/D conversion means for sampling a broadcast text signal supplied from outside the apparatus, with a sampling clock of a predetermined frequency, to convert the text signal into digital data;
binarization means for converting the digital data into a binary signal;
sampling pulse generation means for:
detecting the cycle of clock run-in of the broadcast text signal from the binary signal, obtaining a text data sampling interval value on the basis of the clock run-in cycle, sequentially calculating positions of data in the binary signal, which data are positioned at intervals close to the sampling interval value, starting from a predetermined sampling start position, and generating a sampling pulse that designates the calculated data positions as data sampling positions, and sampling means for sampling text data from the binary signal on the basis of the sampling pulse;

phase error detection means for:

detecting a change point of the binary signal after generating the sampling pulse, generating a phase error detection sampling start pulse for phase error detection, on the basis of a change point and the sampling interval value, comparing the phase error detection sampling start pulse with the sampling pulse, and when a phase error between the phase error detection sampling start pulse and the sampling pulse is detected during sampling the test data, outputting a phase error correction pulse indicating a position where the phase error occurs, and a sampling pulse selection signal indicating that the phase error occurs;

and sampling pulse correction means for:

receiving the sampling pulse, the sampling interval value, the phase error correction pulse, and the sampling pulse selection signal, outputting the sampling pulse as a corrected sampling pulse when the sampling pulse selection signal is not supplied from the phase error detection means, and sequentially calculating, when the sampling pulse selection signal is supplied positions of data within the binary signal, which data are positioned at intervals close to the sampling interval value, starting from a position that is indicated by the phase error correction pulse outputted from the phase error detection means, and generating a pulse that designates the calculated data positions as data sampling positions, and outputting said generated pulse as a corrected sampling pulse;

wherein said sampling means is for sampling the text data on the basis of the corrected sampling pulse, wherein said sampling pulse generation means comprises:

clock run-in position setting means for designating a position of a clock run-in period in the broadcast text signal;

clock run-in cycle detection means for detecting a cycle of the clock run-in in the clock run-in period, from the binary signal;

judgment means for judging a type of the broadcast text signal from the clock run-in cycle detected by the clock run-in cycle detection means, and outputting a text data sampling interval value which is predetermined according to the type of the broadcast text signal;

sampling start period setting means for setting a sampling start period for setting the predetermined sampling start position, within a period in a vicinity of the position between the clock run-in and a framing code in the broadcast text signal;

sampling start pulse generation means for detecting a change point at which the binary signal changes from 0 to 1 within the sampling start period, and generating a sampling start pulse indicating a sampling start position that is shifted from the change point by a first interval smaller than the sampling interval value;

sampling position calculation means for sequentially calculating the positions in the binary signal, which positions are separated at intervals equal to the sampling interval value, starting from the position indicated by the sampling start pulse; and pulse conversion means for calculating data in the binary signal, which data are present in positions close to the respective positions, and generating a sampling pulse that designates the calculated data positions as data sampling positions;

wherein said phase error detection means comprises:

phase error detection sampling start pulse generation means for detecting a change point at which the binary signal changes from 0 to 1, and generating a phase error detection sampling start pulse in a position that is shifted by the first interval from the change point;

phase error detection period setting means for setting a period for phase error detection, including the phase error detection sampling start pulse generation position;

phase error detection pulse generation means for detecting a phase error between the sampling pulse and the phase error detection sampling start pulse, depending on whether the sampling pulse is included in the phase error detection period or not, and when the phase error is detected, generating a phase error detection pulse in the phase error detection period in which the phase error is detected;

phase error correction pulse generation means for outputting, as a phase error correction pulse, the phase error detection sampling start pulse that is included in the period during which the phase error detection pulse is generated; and sampling pulse selection signal output means for outputting a sampling pulse selection signal indicating that the phase error occurs, after the phase error detection pulse is generated; and wherein said sampling pulse correction means comprises:

phase error correction sampling pulse generation means for sequentially calculating the positions of data in the binary signal, which data are positioned at intervals close to the sampling interval value, starting from the phase error correction pulse, and calculating phase error corrected positions, and generating a pulse that designates the calculated data positions as data sampling positions; and corrected sampling pulse selection means for receiving the sampling pulse, and outputting the sampling pulse as a corrected sampling pulse when the sampling pulse selection signal is not inputted, while outputting the pulse generated by the corrected sampling pulse generation means, as a corrected sampling pulse, when the sampling pulse selection signal is inputted.

5. A broadcast text data sampling apparatus, comprising:

A/D conversion means for sampling a broadcast text signal supplied from outside the apparatus, with a sampling clock of a predetermined frequency, to convert the text signal into digital data;

binarization means for converting the digital data into a binary signal;

sampling pulse generation means for:

detecting the cycle of clock run-in of the broadcast text signal from the binary signal, obtaining a text data sampling interval value on the basis of the clock run-in cycle, sequentially calculating positions of data in the binary signal, which data are positioned at intervals close to the sampling interval value, starting from a predetermined sampling start position, generating a sampling pulse that designates the calculated data positions as data sampling positions, and sampling means for sampling text data from the binary signal on the basis of the sampling pulse;

phase error detection means for:

detecting a change point of the binary signal after generating the sampling pulse, generating a phase error detection sampling start pulse for phase error detection, on the basis of a change point and the sampling interval value, comparing the phase error detection sampling start pulse with the sampling pulse, and outputting a phase error correction pulse indicating a position where the phase error occurs, and a sampling pulse selection signed indicating that the phase error occurs, when a phase error between the phase error detection sampling start pulse and the sampling pulse is detected during sampling the text data;

wherein said sampling pulse generation means is for sequentially calculating, after receiving the phase error correction pulse, positions of data within the binary signal, which data are positioned at intervals closest to the sampling interval value, starting from the position indicated by the phase error correction pulse, and for generating a pulse that designates the calculated data positions as data sampling positions, and then outputting said generated pulse as the sampling pulse to the sampling means;

wherein said sampling pulse generation means comprises:

clock run-in position setting means for designating a position of a clock run-in period in the broadcast text signal;

clock run-in cycle detection means for detecting a cycle of clock run-in in the clock run-in period, from the binary signal;

judgment means for judging a type of the broadcast text signal from the clock run-in cycle detected by the clock run-in cycle detection means, and outputting a text data sampling interval value which is predetermined according to the type of the broadcast text signal;

sampling start period setting means for setting a sampling start period for setting the predetermined sampling start position, within a period in the vicinity of the position between the clock run-in and a framing code in the broadcast text signal;

sampling start pulse generation means for detecting a change point at which the binary signal changes from 0 to 1 within the sampling start period, and generating a sampling start pulse indicating a sampling start position that is shifted from the change point by a first interval smaller than the sampling interval value;

synthesis means for synthesizing the sampling start pulse and the phase error correction pulse;

sampling position calculation means for sequentially calculating the positions in the binary signal, which positions are separated at intervals equal to the sampling interval value, starting from the position indicated by the sampling start pulse and the phase error correction pulse which are outputted from the synthesis means; and pulse conversion means for calculating data in the binary signal, which data are present in positions close to the respective positions, and generating a sampling pulse that designates the calculated data positions as data sampling positions; and said phase error detection means comprises:

phase error detection sampling start pulse generation means for detecting a change point at which the binary signal changes from 0 to 1, and generating a phase error detection sampling start pulse in a position that is shifted by the first interval from the change point;

phase error detection period setting means for setting a period for phase error detection, in a position before and after the generation of the phase error detection sampling start pulse;

phase error detection pulse generation means for detecting a phase error between the sampling pulse and the phase error detection sampling start pulse, depending on whether the sampling pulse is included in the phase error detection period or not, and when the phase error is detected, generating a phase error detection pulse in the phase error detection period in which the phase error is detected; and phase error correction pulse generation means for outputting, as a phase error correction pulse, the phase error detection sampling start pulse that is included in the period during which the phase error detection pulse is generated.

\* \* \* \* \*